United States Patent
Kito et al.

(10) Patent No.: US 9,915,862 B2
(45) Date of Patent: Mar. 13, 2018

(54) DISCHARGE LAMP DRIVING DEVICE, PROJECTOR, AND DISCHARGE LAMP DRIVING METHOD

(71) Applicant: SEIKO EPSON CORPORATION, Tokyo (JP)

(72) Inventors: Satoshi Kito, Chino (JP); Shun Sato, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/407,553

(22) Filed: Jan. 17, 2017

(65) Prior Publication Data

US 2017/0219919 A1    Aug. 3, 2017

(30) Foreign Application Priority Data

Feb. 2, 2016   (JP) ................................. 2016-017803

(51) Int. Cl.
| | |
|---|---|
| *G03B 21/14* | (2006.01) |
| *G03B 21/20* | (2006.01) |
| *G03B 21/00* | (2006.01) |
| *H05B 41/36* | (2006.01) |
| *H05B 41/288* | (2006.01) |

(52) U.S. Cl.
CPC ....... *G03B 21/2053* (2013.01); *G03B 21/006* (2013.01); *G03B 21/2026* (2013.01); *H05B 41/2887* (2013.01); *H05B 41/36* (2013.01)

(58) Field of Classification Search
CPC ........ H05B 41/00; H05B 41/02; H05B 41/24; H05B 41/36; G03B 21/2026; G03B 21/2006; G03B 21/2053
See application file for complete search history.

(56) References Cited

U.S. PATENT DOCUMENTS

| | | | |
|---|---|---|---|
| 8,459,802 B2 | 6/2013 | Ono et al. | |
| 8,513,893 B2 | 8/2013 | Ono et al. | |
| 9,332,623 B2 | 5/2016 | Fukuda et al. | |
| 9,563,111 B2 * | 2/2017 | Nakagomi | ......... G03B 21/2026 |
| 9,602,791 B2 * | 3/2017 | Terashima | ......... G03B 21/2053 |
| 9,693,435 B2 * | 6/2017 | Kono | ................. H05B 41/2828 |

(Continued)

FOREIGN PATENT DOCUMENTS

| | | |
|---|---|---|
| JP | 2011-124184 A | 6/2011 |
| JP | 2014-032760 A | 2/2014 |
| WO | 2009-122678 A1 | 10/2009 |

*Primary Examiner* — William C Dowling
(74) *Attorney, Agent, or Firm* — Oliff PLC

(57) ABSTRACT

In a discharge lamp driving device, a mixed period is provided, in which a first period in which an alternating current is supplied and a second period in which a direct current is supplied are alternately repeated and a third period alternately including a first direct current period and a second direct current period in which a direct current having a polarity opposite to a polarity of the direct current in the first direct current period is supplied. Length of the second direct current period is smaller than 0.5 ms. A total of lengths of the first direct current periods in the third period is larger than length of the second period. The third period is not provided at least when the inter-electrode voltage is smaller than a first predetermined value or when a cumulative lighting time of the discharge lamp is smaller than a second predetermined value.

20 Claims, 15 Drawing Sheets

(56) References Cited

U.S. PATENT DOCUMENTS

| | | | |
|---|---|---|---|
| 9,785,041 B2* | 10/2017 | Sato | G03B 21/2053 |
| 2011/0025989 A1 | 2/2011 | Ono et al. | |
| 2012/0074858 A1 | 3/2012 | Ono et al. | |
| 2015/0201481 A1 | 7/2015 | Fukuda et al. | |
| 2016/0360600 A1* | 12/2016 | Sato | G03B 21/006 |
| 2017/0076645 A1* | 3/2017 | Terashima | H05B 41/36 |
| 2017/0219919 A1* | 8/2017 | Kito | H05B 41/2887 |
| 2017/0227840 A1* | 8/2017 | Terashima | G03B 21/2053 |
| 2017/0277032 A1* | 9/2017 | Terashima | G03B 21/005 |

* cited by examiner

DISCHARGE LAMP DRIVING DEVICE, PROJECTOR, AND DISCHARGE LAMP DRIVING METHOD

BACKGROUND

1. Technical Field

The present invention relates to a discharge lamp driving device, a light source device, a projector, and a discharge lamp driving method.

2. Related Art

For example, JP-A-2011-124184 (Patent Literature 1) describes a configuration for switching the frequency of an alternating current supplied to a high voltage discharge lamp to a first frequency and a second frequency larger than the first frequency.

For example, in Patent Literature 1, for the purpose of suppressing wear of distal end portions of electrodes, a period is provided in which the alternating current having the first frequency is supplied to the high voltage discharge lamp in the length of a half cycle. However, in this method, the wear of the distal end portions of the electrodes cannot be sufficiently suppressed according to deterioration of the high voltage discharge lamp. Therefore, the life of the high voltage discharge lamp cannot be sufficiently improved.

SUMMARY

An advantage of some aspects of the invention is to provide a discharge lamp driving device that can improve the life of a discharge lamp, a light source device including the discharge lamp driving device, and a projector including the light source device. Another advantage of some aspects of the invention is to provide a discharge lamp driving method that can improve the life of a discharge lamp.

A discharge lamp driving device according to an aspect of the invention includes: a discharge lamp driving section configured to supply a driving current to a discharge lamp including a first electrode and a second electrode; a control section configured to control the discharge lamp driving section; and a detecting section configured to detect an inter-electrode voltage of the discharge lamp. The control section is configured to provide a mixed period in which a first period in which an alternating current is supplied to the discharge lamp and a second period in which a direct current is supplied to the discharge lamp are alternately repeated and a third period alternately including a first direct current period in which a direct current is supplied to the discharge lamp and a second direct current period in which a direct current having a polarity opposite to a polarity of the direct current supplied to the discharge lamp in the first direct current period is supplied to the discharge lamp. Length of the second direct current period is smaller than 0.5 ms. A total of lengths of a plurality of the first direct current periods in the third period is larger than length of the second period. The control section is configured not to provide the third period at least when the inter-electrode voltage is smaller than a first predetermined value or when a cumulative lighting time of the discharge lamp is smaller than a second predetermined value.

In the discharge lamp driving device according to the aspect of the invention, the third period is provided in addition to the mixed period in which the first period in which the alternating current is supplied to the discharge lamp and the second period in which the direct current is supplied to the discharge lamp are alternately repeated. In the third period, the first direct current period and the second direct current period are provided. The total of the lengths of the first direct current periods is larger than the length of the second period. Therefore, in the third period, a heat load applied to the electrodes tends to be large compared with the second period.

Consequently, since the third period is provided, it is possible to increase fluctuation in the heat load applied to the electrodes. It is possible to facilitate growth of protrusions of the electrodes. Therefore, with the discharge lamp driving device according to the aspect of the invention, it is easy to maintain the shape of the protrusions. It is possible to improve the life of the discharge lamp.

In the driving including the third period, a relatively large heat load is applied to the protrusion of the first electrode and the protrusion of the second electrode to melt the protrusions to facilitate the growth of the protrusions. However, in a stage of a relatively early period in which the discharge lamp is not deteriorated, the protrusions are relatively easily melted. Therefore, the protrusions are sometimes excessively melted when the driving including the third period is executed. Consequently, in some case, the protrusions wear or disappear, an inter-electrode distance between the first electrode and the second electrode increases, and the illuminance of a projector decreases.

On the other hand, in the discharge lamp driving device according to the aspect of the invention, the third period is not provided at least when the inter-electrode voltage is smaller than the first predetermined value or when the cumulative lighting time is smaller than the second predetermined value. Therefore, it is possible to suppress the protrusions from wearing or disappearing in an initial stage of the discharge lamp. Consequently, it is possible to suppress the illuminance of the projector from decreasing.

The length of the first direct current period may be ten times or more the length of the second direct current period.

With this configuration, it is possible to suitably heat the electrodes in the third period.

The total of the lengths of the first direct current periods in the third period may be equal to or larger than 10 ms and equal to or smaller than 1.0 s.

With this configuration, it is possible to suitably heat the electrodes in the third period.

A plurality of the mixed periods may be provided, and the third period may be provided between the mixed periods temporally adjacent to each other and be provided immediately after the first period.

With this configuration, it is easy to provide the third period at an appropriate interval. It is easier to maintain the shape of the protrusions.

A plurality of the third periods may be provided, and a polarity of the direct current supplied to the discharge lamp in the first direct current period and a polarity of the direct current supplied to the discharge lamp in the second direct current period may be inverted every time the third period is provided.

With this configuration, it is easy to maintain both of the shapes of the protrusions of the two electrodes.

The control section may be configured to provide a fourth period in which an alternating current having a second frequency smaller than a first frequency of the alternating current supplied to the discharge lamp in the first period is supplied to the discharge lamp, and the total of the lengths of the first direct current periods in the third period may be larger than length of a half cycle of the alternating current having the second frequency.

With this configuration, since the fourth period is provided, it is possible to adjust the shape of the protrusions.

A plurality of the mixed periods may be provided, and the fourth period may be provided between the mixed periods temporally adjacent to each other and be provided immediately after the first period.

With this configuration, it is easy to provide the fourth period at an appropriate interval. It is easier to maintain the shape of the protrusions.

The control section may be configured to provide one of the third period and the fourth period at first predetermined interval.

With this configuration, it is easy to provide the third period and the fourth period at an appropriate interval. It is easier to maintain the shape of the protrusions.

The control section may be configured to provide the fourth period at second predetermined interval larger than the first predetermined interval.

With this configuration, it is easy to set a frequency of the provision of the fourth period lower than a frequency of the provision of the third period. Therefore, it is easy to more appropriately cause the heat load applied to the electrodes to fluctuate.

A light source device according to another aspect of the invention includes: a discharge lamp configured to emit light; and the discharge lamp driving device.

With the light source device according to the aspect of the invention, since the light source device includes the discharge lamp driving device, it is possible to improve the life of the discharge lamp.

A projector according to still another aspect of the invention includes: the light source device; a light modulating device configured to modulate light emitted from the light source device according to an image signal; and a projection optical system configured to project the light modulated by the light modulating device.

With the projector according to the aspect of the invention, since the projector includes the light source device, it is possible to improve the life of the discharge lamp.

A discharge lamp driving method according to yet another aspect of the invention a discharge lamp driving method for supplying a driving current to a discharge lamp including a first electrode and a second electrode and driving the discharge lamp. The discharge lamp driving method includes supplying the discharge lamp with the driving current including a mixed period in which a first period in which an alternating current is supplied to the discharge lamp and a second period in which a direct current is supplied to the discharge lamp are alternately repeated and a third period alternately including a first direct current period in which a direct current is supplied to the discharge lamp and a second direct current period in which a direct current having a polarity opposite to a polarity of the direct current supplied to the discharge lamp in the first direct current period is supplied to the discharge lamp. Length of the second direct current period is smaller than 0.5 ms. A total of lengths of a plurality of the first direct current periods in the third period is larger than length of the second period. The third period is not provided at least when the inter-electrode voltage is smaller than a first predetermined value or a cumulative lighting time of the discharge lamp is smaller than a second predetermined value.

With the discharge lamp driving method according to the aspect of the invention, in the same manner as explained above, it is possible to improve the life of the discharge lamp.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
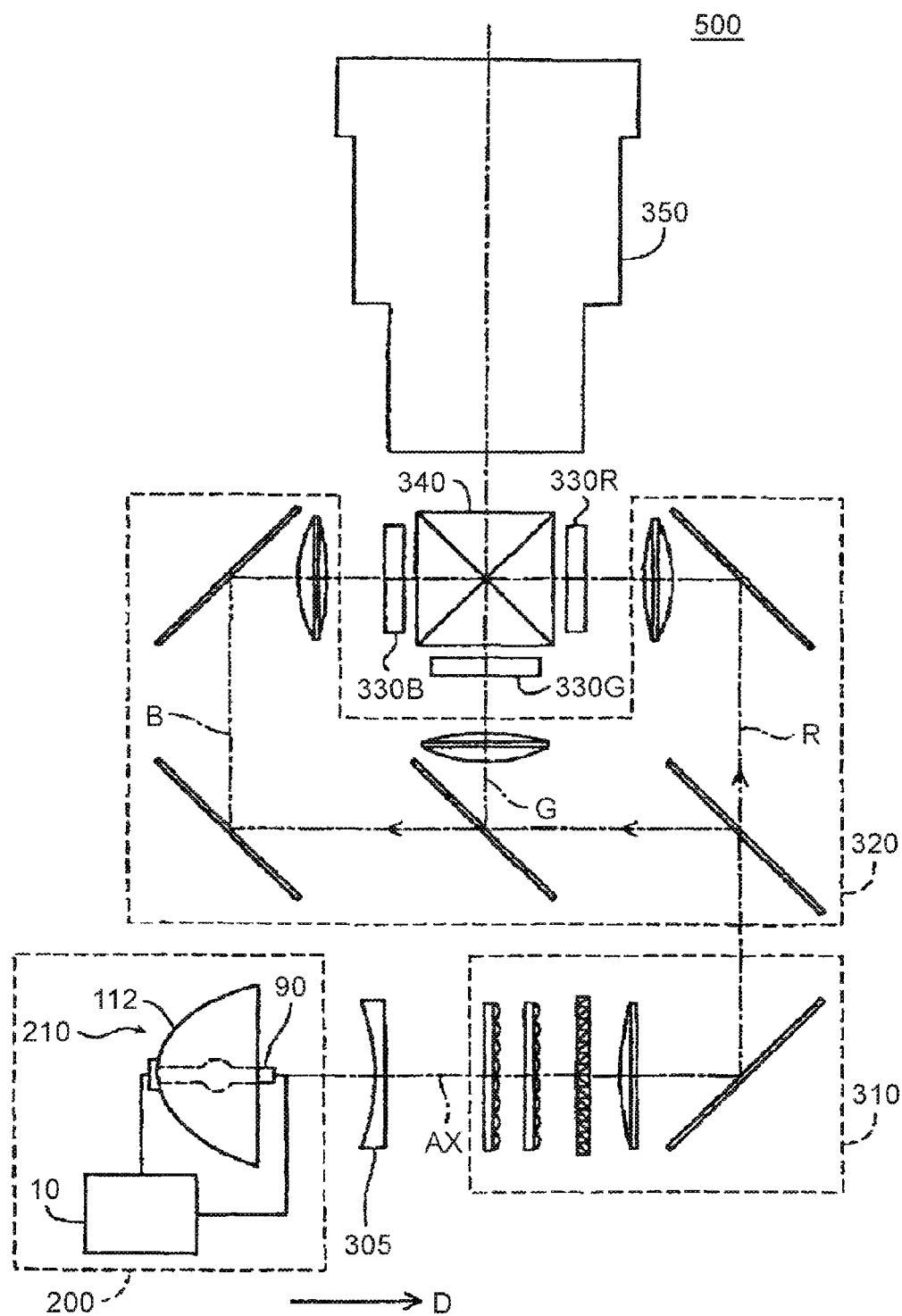
FIG. 1 is a schematic configuration diagram showing a projector in an embodiment.

A projector according to an embodiment of the invention is explained below with reference to the drawings.

Note that the scope of the invention is not limited to the embodiment explained below and can be optionally changed within the scope of the technical idea of the invention. In the drawings referred to below, in order to clearly show components, scales, numbers, and the like in structures are sometimes differentiated from those in actual structures.

FIG. 1 is a schematic configuration diagram showing a projector 500 in the embodiment. As shown in FIG. 1, the projector 500 in this embodiment includes a light source device 200, a collimating lens 305, an illumination optical system 310, a color separation optical system 320, three liquid crystal light valves (light modulating devices) 330R, 330G, and 330B, a cross dichroic prism 340, and a projection optical system 350.

Light emitted from the light source device 200 passes through the collimating lens 305 and is made incident on the illumination optical system 310. The collimating lens 305 collimates the light from the light source device 200.

The illumination optical system 310 adjusts the illuminance of the light emitted from the light source device 200 to be equalized on the liquid crystal light valves 330R, 330G, and 330B. Further, the illumination optical system 310 aligns polarization directions of the light emitted from the light source device 200 in one direction. This is for the purpose of effectively using the light emitted from the light source device 200 in the liquid crystal light valves 330R, 330G, and 330B.

The light with the illuminance distribution and the polarization directions adjusted is made incident on the color separation optical system 320. The color separation optical system 320 separates the incident light into three color lights, that is, red light (R), green light (G), and blue light (B). The three color lights are respectively modulated according to video signals by the liquid crystal light valves 330R, 330G, and 330B associated with the color lights. The liquid crystal light valves 330R, 330G, and 330B include liquid crystal panels 560R, 560G, and 560B explained below and polarizing plates (not shown in the figure). The polarizing plates are disposed on a light incident side and a light emission side of each of the liquid crystal panels 560R, 560G, and 560B.

The modulated three color lights are combined by the cross dichroic prism 340. Combined light is made incident on the projection optical system 350. The projection optical system 350 projects the incident light on a screen 700 (see FIG. 3). Consequently, a video is displayed on the screen 700. Note that well-known configurations can be adopted as the respective configurations of the collimating lens 305, the illumination optical system 310, the color separation optical system 320, the cross dichroic prism 340, and the projection optical system 350.

Figure 2:
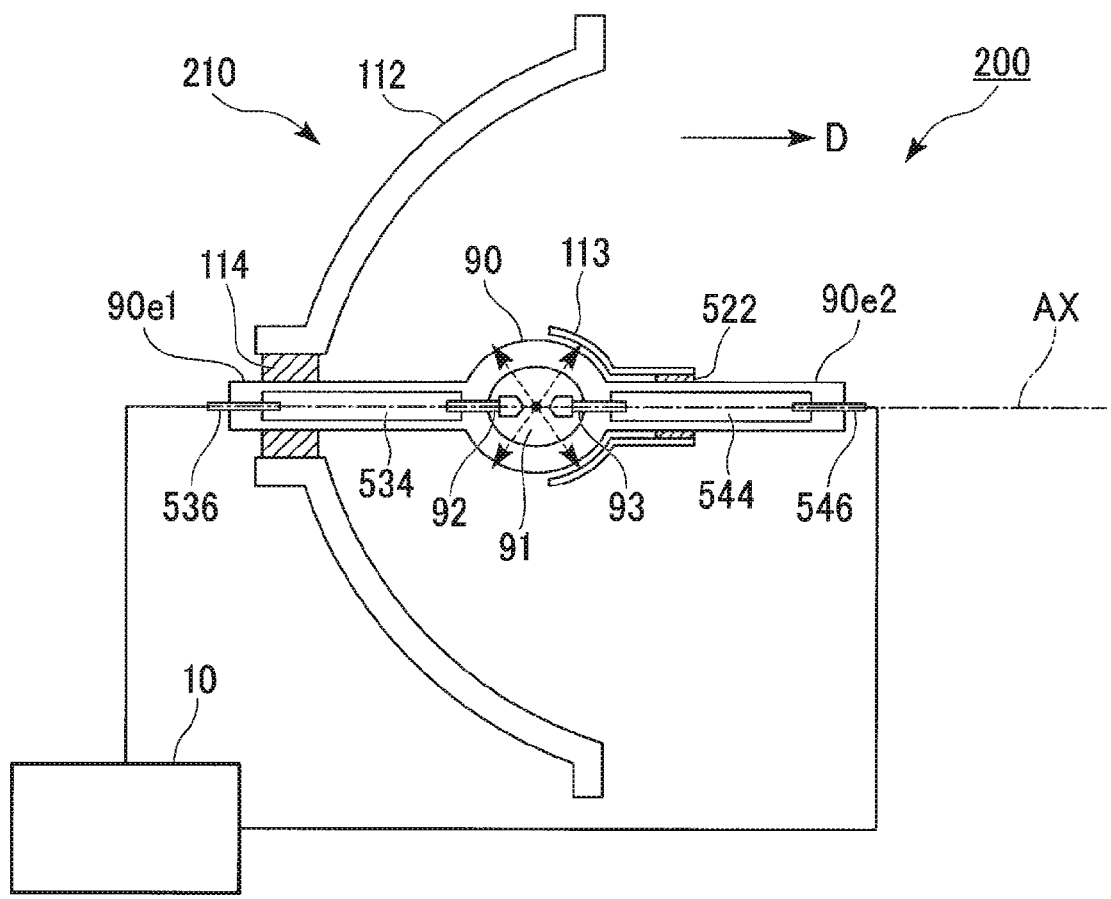
FIG. 2 is a diagram showing a discharge lamp in the embodiment.

FIG. 2 is a sectional view showing the configuration of the light source device 200. The light source device 200 includes a light source unit 210 and a discharge lamp lighting device (a discharge lamp driving device) 10. In FIG. 2, a sectional view of the light source unit 210 is shown. The light source unit 210 includes a main reflection mirror 112, a discharge lamp 90, and a sub reflection mirror 113.

The discharge lamp lighting device 10 supplies a driving current I to the discharge lamp 90 and lights the discharge lamp 90. The main reflection mirror 112 reflects light discharged from the discharge lamp 90 toward a radiating direction D. The radiating direction D is parallel to an optical axis AX of the discharge lamp 90.

The shape of the discharge lamp 90 is a bar shape extending along the radiating direction D. One end portion of the discharge lamp 90 is referred to as first end portion 90e1. The other end portion of the discharge lamp 90 is referred to as second end portion 90e2. The material of the discharge lamp 90 is, for example, a translucent material such as quartz glass. The center of the discharge lamp 90 is swelled in a spherical shape. The inside of the discharge lamp 90 is a discharge space 91. In the discharge space 91, gas, which is an electric discharge medium, including rare gas and a metal halogen compound is encapsulated.

The distal ends of a first electrode 92 and a second electrode 93 project into the discharge space 91. The first electrode 92 is disposed on the first end portion 90e1 side of the discharge space 91. The second electrode 93 is disposed on the second end portion 90e2 side of the discharge space 91. The shape of the first electrode 92 and the second electrode 93 are a bar shape extending along the optical axis AX. In the discharge space 91, electrode distal end portions of the first electrode 92 and the second electrode 93 are disposed to be spaced apart by a predetermined distance and opposed to each other. The material of the first electrode 92 and the second electrode 93 is metal such as tungsten.

A first terminal 536 is provided at the first end portion 90e1 of the discharge lamp 90. The first terminal 536 and the first electrode 92 are electrically connected by a conductive member 534 that pierces through the inside of the discharge lamp 90. Similarly, a second terminal 546 is provided at the second end portion 90e2 of the discharge lamp 90. The second terminal 546 and the second electrode 93 are electrically connected by a conductive member 544 that pierces through the inside of the discharge lamp 90. The material of the first terminal 536 and the second terminal 546 is metal such as tungsten. As the material of the conductive members 534 and 544, for example, molybdenum foil is used.

The first terminal 536 and the second terminal 546 are connected to the discharge lamp lighting device 10. The discharge lamp lighting device 10 supplies the driving current I for driving the discharge lamp 90 to the first terminal 536 and the second terminal 546. As a result, arc discharge occurs between the first electrode 92 and the second electrode 93. Light (discharge light) generated by the arc discharge is radiated toward all directions from a discharge position as indicated by broken line arrows.

The main reflection mirror 112 is fixed to the first end portion 90e1 of the discharge lamp 90 by a fixing member 114. The main reflection mirror 112 reflects, toward the radiating direction D, in the discharge light, light traveling toward the opposite side of the radiating direction D. The shape of a reflection surface (a surface on the discharge lamp 90 side) of the main reflection mirror 112 is not particularly limited within a range in which the discharge light can be reflected toward the radiating direction D. For example, the shape may be a spheroidal shape or may be a rotated parabolic shape. For example, when the shape of the reflection surface of the main reflection mirror 112 is the rotated parabolic shape, the main reflection mirror 112 can convert the discharge light into light substantially parallel to the optical axis AX. Consequently, the collimating lens 305 can be omitted.

The sub reflection mirror 113 is fixed to the second end portion 90e2 side of the discharge lamp 90 by a fixing member 522. The shape of a reflection surface (a surface on the discharge lamp 90 side) of the sub reflection mirror 113 is a spherical shape including a portion on the second end portion 90e2 side of the discharge space 91. The sub reflection mirror 113 reflects, toward the main reflection mirror 112, in the discharge light, light traveling toward the opposite side of a side where the main reflection mirror 112 is disposed. Consequently, it is possible to improve efficiency of use of the light radiated from the discharge space 91.

The material of the fixing members 114 and 522 is not particularly limited within a range in which the material is a heat resistant material that can withstand heat generation from the discharge lamp 90. The material is, for example, an inorganic adhesive. A method of fixing the disposition of the main reflection mirror 112 and the sub reflection mirror 113 and the discharge lamp 90 is not limited to a method of fixing the main reflection mirror 112 and the sub reflection mirror 113 to the discharge lamp 90. Any method can be adopted. For example, the discharge lamp 90 and the main reflection mirror 112 may be independently fixed to a housing (not shown in the figure) of the projector 500. The same applies to the sub reflection mirror 113.

A circuit configuration of the projector 500 is explained below.

Figure 3:
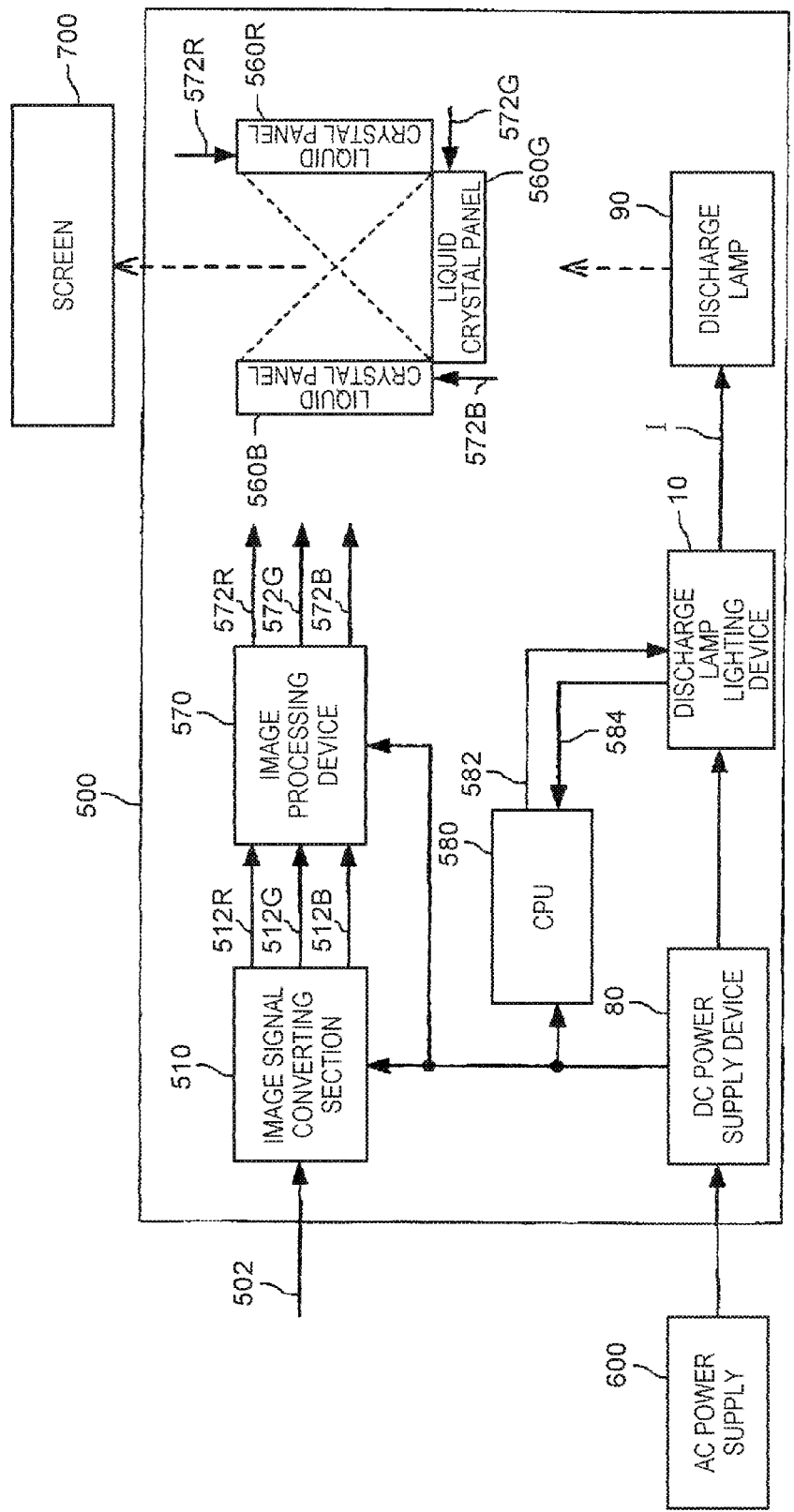
FIG. 3 is a block diagram showing various components of the projector in the embodiment.

FIG. 3 is a diagram showing the circuit configuration of the projector 500 in this embodiment. The projector 500 includes, besides the optical system shown in FIG. 1, an image signal converting section 510, a DC power supply device 80, liquid crystal panels 560R, 560G, and 560B, an image processing device 570, and a CPU (Central Processing Unit) 580.

The image signal converting section 510 converts an image signal 502 (a luminance-color difference signal, an analog RGB signal, etc.) input from the outside into a digital RGB signal having predetermined word length to generate image signals 512R, 512G, and 512B and supplies the image signals 512R, 512G, and 512B to the image processing device 570.

The image processing apparatus 570 performs image processing respectively on the three image signals 512R, 512G, and 512B. The image processing apparatus 570 supplies driving signals 572R, 572G, and 572B for respectively driving the liquid crystal panels 560R, 560G, and 560B to the liquid crystal panels 560R, 560G, and 560B.

The DC power supply device 80 converts an AC voltage supplied from an external AC power supply 600 into a constant DC voltage. The DC power supply device 80 supplies the DC voltage to the image signal converting section 510 present on a secondary side of a transformer (although not shown in the figure, included in the DC power supply device 80), the image processing device 570, and the discharge lamp lighting device 10 present on a primary side of the transformer.

The discharge lamp lighting device 10 generates a high voltage between the electrodes of the discharge lamp 90 during a start and causes dielectric breakdown to form a discharge path. Thereafter, the discharge lamp lighting device 10 supplies the driving current I for the discharge lamp 90 to maintain electric discharge.

The liquid crystal panels 560R, 560G, and 560B are respectively provided in the liquid crystal light valves 330R, 330G, and 330B explained above. The liquid crystal panels 560R, 560G, and 560B respectively modulate, on the basis of the driving signals 572R, 572G, and 572B, transmittances (luminances) of the color lights made incident on the liquid crystal panels 560R, 560G, and 560B via the optical system explained above.

The CPU 580 controls various operations from a lighting start to extinction of the projector 500. For example, in the example shown in FIG. 3, the CPU 580 outputs a lighting command and an extinguishing command to the discharge lamp lighting device 10 via a communication signal 582. The CPU 580 receives lighting information of the discharge lamp 90 from the discharge lamp lighting device 10 via a communication signal 584.

The configuration of the discharge lamp lighting device 10 is explained below.

Figure 4:
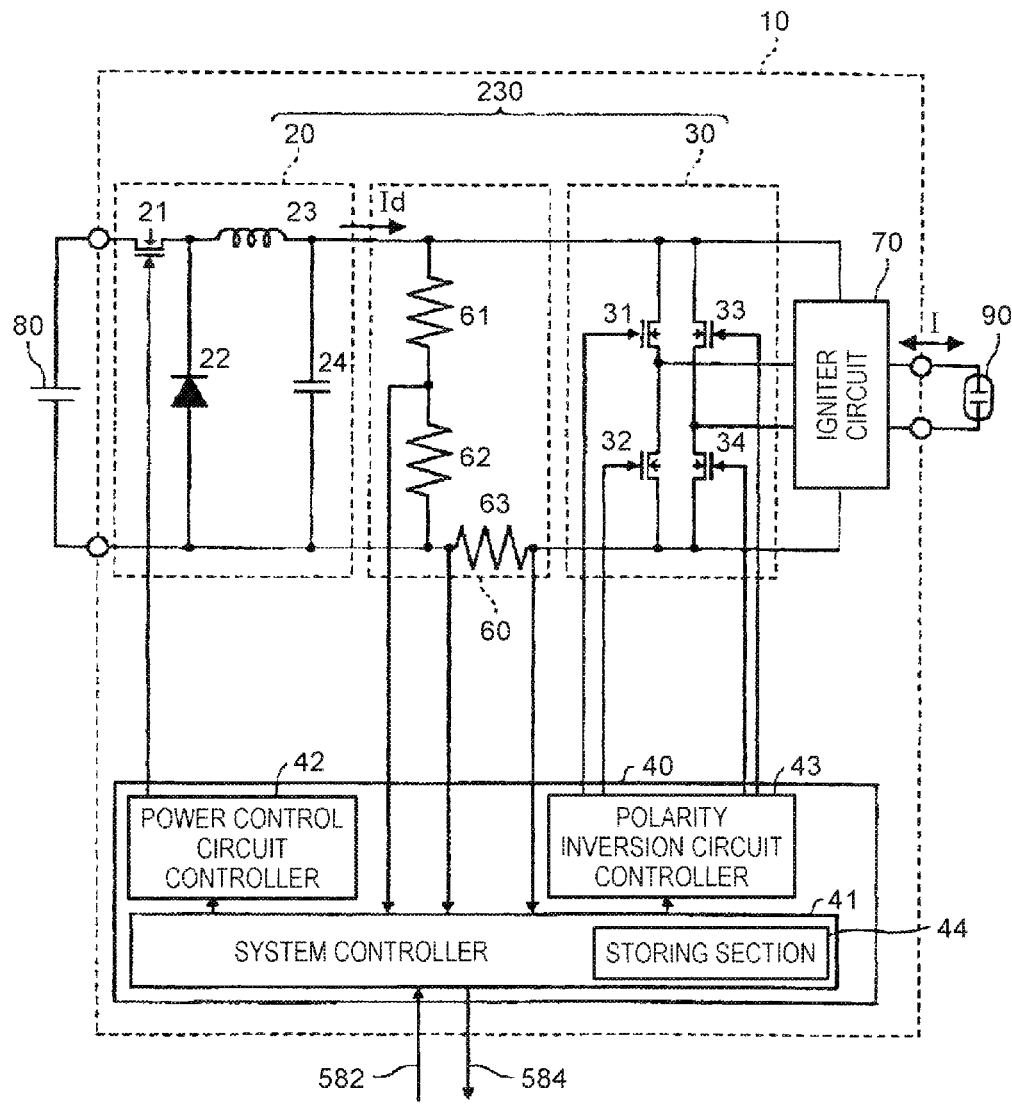
FIG. 4 is a circuit diagram of a discharge lamp lighting device in the embodiment.

FIG. 4 is a diagram showing an example of a circuit configuration of the discharge lamp lighting device 10.

The discharge lamp lighting device 10 includes, as shown in FIG. 4, a power control circuit 20, a polarity inversion circuit 30, a control section 40, an operation detecting section 60, and an igniter circuit 70.

The power control circuit 20 generates driving power supplied to the discharge lamp 90. In this embodiment, the power control circuit 20 is configured by a down-chopper circuit that receives a voltage from the DC power supply device 80 as an input, steps down the input voltage, and outputs a direct current Id.

The power control circuit 20 includes a switch element 21, a diode 22, a coil 23, and a capacitor 24. The switch element 21 is configured by, for example, a transistor. In this embodiment, one end of the switch element 21 is connected to a positive voltage side of the DC power supply device 80. The other end is connected to a cathode terminal of the diode 22 and one end of the coil 23.

One end of the capacitor 24 is connected to the other end of the coil 23. The other end of the capacitor 24 is connected to an anode terminal of the diode 22 and a negative voltage side of the DC power supply device 80. A current control signal is input to a control terminal of the switch element 21 from the control section 40 explained below and ON/OFF of the switch element 21 is controlled. As the current control signal, for example, a PWM (Pulse Width Modulation) control signal may be used.

When the switch element 21 is turned on, an electric current flows to the coil 23 and energy is accumulated in the coil 23. Thereafter, when the switch element 21 is turned off, the energy accumulated in the coil 23 is emitted through a route passing the capacitor 24 and the diode 22. As a result, the direct current Id corresponding to a ratio of ON time of the switch element 21 is generated.

The polarity inversion circuit 30 inverts, at predetermined timing, the polarity of the direct current Id input from the power control circuit 20. Consequently, the polarity inversion circuit 30 generates the driving current I, which is a direct current continuing for a controlled time, or the driving current I, which is an alternating current having any frequency, and outputs the driving current I. In this embodiment, the polarity inversion circuit 30 is configured by an inverter-bridge circuit (a full-bridge circuit).

The polarity inversion circuit 30 includes a first switch element 31, a second switch element 32, a third switch element 33, and a fourth switch element 34 configured by transistors or the like. The polarity inversion circuit 30 includes a configuration in which the first switch element 31 and the second switch element 32 connected in series and the third switch element 33 and the fourth switch element 34 connected in series are connected in parallel to each other. Polarity inversion control signals are respectively input to control terminals of the first switch element 31, the second switch element 32, the third switch element 33, and the fourth switch element 34 from the control section 40. ON/OFF operation of the first switch element 31, the second switch element 32, the third switch element 33, and the fourth switch element 34 is controlled on the basis of the polarity inversion control signals.

In the polarity inversion circuit 30, operation for alternately turning on and off the first and fourth switch elements 31 and 34 and the second and third switch elements 32 and 33 is repeated. Consequently, the polarity of the direct current Id output from the power control circuit 20 is alternately inverted. The polarity inversion circuit 30 generates the driving current I, which is a direct current that continues the same polarity state for a controlled time, or the driving current I, which is an alternating current having a controlled frequency, and outputs the driving current I from a common connection point of the first switch element 31 and the second switch element 32 and a common connection point of the third switch element 33 and the fourth switch element 34.

That is, the polarity inversion circuit 30 is controlled such that, when the first switch element 31 and the fourth switch element 34 are on, the second switch element 32 and the third switch element 33 are off and, when the first switch element 31 and the fourth switch element 34 are off, the second switch element 32 and the third switch element 33 are on. Therefore, when the first switch element 31 and the fourth switch element 34 are on, the driving current I flowing from one end of the capacitor 24 to the first switch element 31, the discharge lamp 90, and the fourth switch element 34 in this order is generated. When the second switch element 32 and the third switch element 33 are on, the driving current I flowing from one end of the capacitor 24 to the third switch element 33, the discharge lamp 90, and the second switch element 32 in this order is generated.

In this embodiment, a combined portion of the power control circuit 20 and the polarity inversion circuit 30 corresponds to the discharge lamp driving section 230. That is, the discharge lamp driving section 230 supplies the driving current I for driving the discharge lamp 90 to the discharge lamp 90.

The control section 40 controls the discharge lamp driving section 230. In the example shown in FIG. 4, the control section 40 controls the power control circuit 20 and the polarity inversion circuit 30 to thereby control parameters such as a retention time in which the driving current I continues in the same polarity, a current value of the driving current I (a power value of driving power), and a frequency of the driving current I. The control section 40 performs, on the polarity inversion circuit 30, according to polarity inversion timing for the driving current I, polarity inversion control for controlling the retention time in which the driving current I continues in the same polarity, the frequency of the driving current I, and the like. The control section 40 performs, on the power control circuit 20, current control for controlling a current value of the direct current Id to be output.

In this embodiment, the control section 40 is capable of executing alternating current driving, direct current driving, biased driving, low frequency alternating current driving, and mixed driving. The alternating current driving is driving in which an alternating current is supplied to the discharge lamp 90. The direct current driving is driving in which a direct current is supplied to the discharge lamp 90.

The biased driving is driving in which direct currents having different polarities are alternately supplied to the discharge lamp 90 and the length of the direct current having one polarity is sufficiently longer than the length of the direct current having the other polarity. The low frequency alternating current driving is driving in which an alternating current having a frequency lower than the frequency of the alternating current of the alternating current driving is supplied to the discharge lamp 90. The mixed driving is driving in which the alternating current driving and the direct current driving are alternately executed. Driving current waveforms of the driving current I supplied to the discharge lamp 90 by the respective kinds of discharge lamp driving are explained in detail below.

The configuration of the control section 40 is not particularly limited. In this embodiment, the control section 40 includes a system controller 41, a power control circuit controller 42, and a polarity inversion circuit controller 43. Note that a part or the entire control section 40 may be configured by a semiconductor integrated circuit.

The system controller 41 controls the power control circuit controller 42 and the polarity inversion circuit controller 43 to thereby control the power control circuit 20 and the polarity inversion circuit 30. The system controller 41 may control the power control circuit controller 42 and the polarity inversion circuit controller 43 on the basis of a lamp voltage (an inter-electrode voltage) Vla detected by the operation detecting section 60 and the driving current I.

In this embodiment, a storing section 44 is connected to the system controller 41.

The system controller 41 may control the power control circuit 20 and the polarity inversion circuit 30 on the basis of information stored in the storing section 44. In the storing section 44, information concerning driving parameters such as a retention time in which the driving current I continues in the same polarity and a current value, a frequency, a waveform, and a modulation pattern of the driving current I may be stored.

The power control circuit controller 42 outputs a current control signal to the power control circuit 20 on the basis of a control signal from the system controller 41 to thereby control the power control circuit 20.

The polarity inversion circuit controller 43 outputs a polarity inversion control signal to the polarity inversion circuit 30 on the basis of a control signal from the system controller 41 to thereby control the polarity inversion circuit 30.

The control section 40 is realized using a dedicated circuit to be capable of performing the control explained above and various kinds of control of processing explained below. On the other hand, for example, a CPU executes a control program stored in the storing section 44, whereby the control section 40 functions as a computer to be capable of performing the various kinds of control of the processing.

Figure 5:
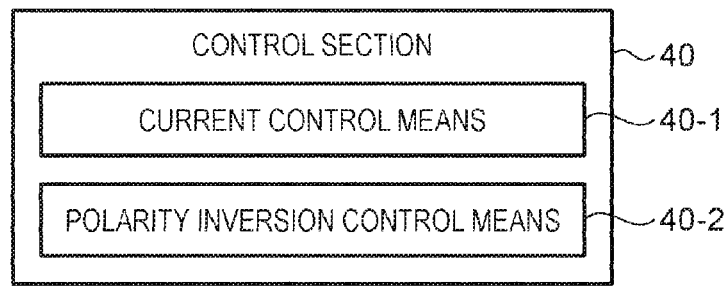
FIG. 5 is a block diagram showing a configuration example of a control section in the embodiment.

FIG. 5 is a diagram for explaining another configuration example of the control section 40. As shown in FIG. 5, the control section 40 may be configured to function as, according to a control program, a current control unit 40-1 for controlling the power control circuit 20 and a polarity inversion control unit 40-2 for controlling the polarity inversion circuit 30.

In the example shown in FIG. 4, the control section 40 is configured as a part of the discharge lamp lighting device 10. On the other hand, the CPU 580 may be configured to perform a part of the functions of the control section 40.

In this embodiment, the operation detecting section 60 includes a voltage detecting section that detects the lamp voltage Vla of the discharge lamp 90 and outputs lamp voltage information to the control section 40. The operation detecting section 60 may include a current detecting section that detects the driving current I and outputs driving current information to the control section 40. In this embodiment, the operation detecting section 60 includes a first resistor 61, a second resistor 62, and a third resistor 63.

In this embodiment, the voltage detecting section of the operation detecting section 60 detects the lamp voltage Vla according to voltages divided by the first resistor 61 and the second resistor 62 connected in parallel to the discharge lamp 90 and connected in series to each other. In this embodiment, the current detecting section detects the driving current I according to a voltage generated in the third resistor 63 connected in series to the discharge lamp 90.

The igniter circuit 70 operates only during a lighting start of the discharge lamp 90. The igniter circuit 70 supplies, to between the electrodes (between the first electrode 92 and the second electrode 93) of the discharge lamp 90, a high voltage (a voltage higher than a voltage during normal lighting of the discharge lamp 90) necessary to performing dielectric breakdown to form a discharge path between electrodes (between the first electrode 92 and the second electrode 93) of the discharge lamp 90 during a lighting start of the discharge lamp 90. In this embodiment, the igniter circuit 70 is connected in parallel to the discharge lamp 90.

Figures 6A, 6B:
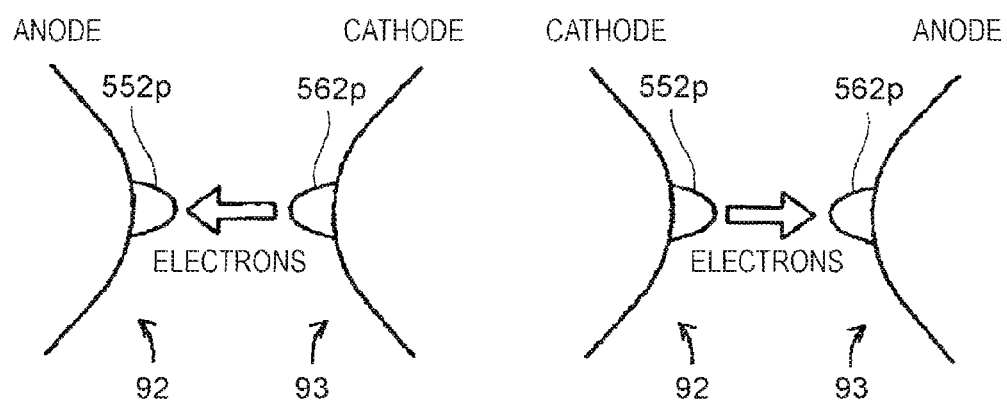
FIGS. 6A and 6B are diagrams showing states of protrusions at electrode distal ends of the discharge lamp.

In FIGS. 6A and 6B, distal end portions of the first electrode 92 and the second electrode 93 are shown. Protrusions 552p and 562p are respectively formed at the distal ends of the first electrode 92 and the second electrode 93.

Electric discharge that occurs between the first electrode 92 and the second electrode 93 mainly occurs between the protrusion 552p and the protrusion 562p. When the protrusions 552p and 562p are present as in this embodiment, compared with when protrusions are absent, it is possible to suppress movement of electric discharge positions (arc positions) in the first electrode 92 and the second electrode 93.

FIG. 6A shows a first polarity state in which the first electrode 92 operates as an anode and the second electrode 93 operates as a cathode. In the first polarity state, electrons move from the second electrode 93 (the cathode) to the first electrode 92 (the anode) according to electric discharge. The electrons are emitted from the cathode (the second electrode 93). The electrons emitted from the cathode (the second electrode 93) collide with the distal end of the anode (the first electrode 92). Heat is generated by the collision. The temperature at the distal end (the protrusion 552p) of the anode (the first electrode 92) rises.

FIG. 6B shows a second polarity state in which the first electrode 92 operates as a cathode and the second electrode 93 operates as an anode. In the second polarity state, conversely to the first polarity state, electrons move from the first electrode 92 to the second electrode 93. As a result, the temperature at the distal end (the protrusion 562p) of the second electrode 93 rises.

In this way, the driving current I is supplied to the discharge lamp 90, whereby the temperature of the anode, with which the electrons collide, rises. On the other hand, the temperature of the cathode, which emits the electrons, drops while the cathode is emitting the electrons toward the anode.

The inter-electrode distance between the first electrode 92 and the second electrode 93 increases according to deterioration of the protrusions 552p and 562p. This is because the protrusions 552p and 562p wear. When the inter-electrode distance increases, since the resistance between the first electrode 92 and the second electrode 93 increases, the lamp voltage Vla increases. Therefore, it is possible to detect a change in the inter-electrode distance, that is, a deterioration degree of the discharge lamp 90.

Note that, since the first electrode 92 and the second electrode 93 have the same configuration, in the following explanation, only the first electrode 92 is sometimes representatively explained. Since the protrusion 552p at the distal end of the first electrode 92 and the protrusion 562p at the distal end of the second electrode 93 have the same configuration, in the following explanation, only the protrusion 552p is sometimes representatively explained.

Control of the discharge lamp driving section 230 by the control section 40 in this embodiment is explained below. In this embodiment, the control section 40 combines the four kinds of driving, that is, the alternating current driving, the direct current driving, the biased driving, and the low frequency alternating current driving to control the discharge lamp driving section 230.

In this embodiment, the control section 40 controls the discharge lamp driving section 230 such that, for example, a predetermined driving cycle is repeated. The predetermined driving cycle includes a driving cycle C1 and a driving cycle C2. In this embodiment, the driving cycle C1 and the driving cycle C2 are switched according to the lamp voltage Vla and a cumulative lighting time tt.

Figure 7:
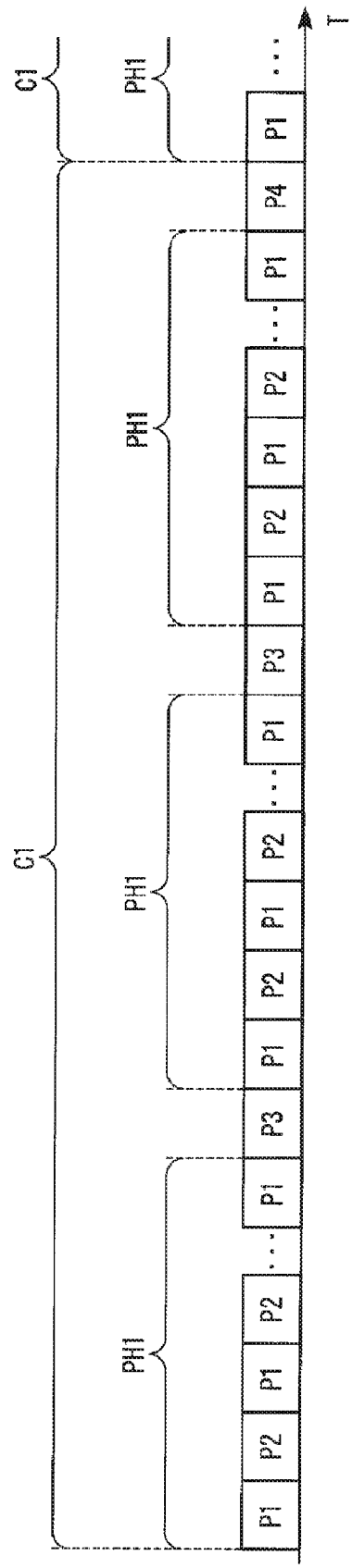
FIG. 7 is a schematic diagram showing a change in a period in which a driving current is supplied to the discharge lamp in the embodiment.

A change in a period in which the driving current I is supplied to the discharge lamp 90 in the driving cycles is explained. First, the driving cycle C1 is explained. FIG. 7 shows an example in which the discharge lamp driving section 230 is controlled such that the driving cycle C1 is repeated.

As shown in FIG. 7, in this embodiment, the driving cycle C1 includes a first period P1, a second period P2, a third period P3, and a fourth period P4. In the driving cycle C1, a mixed period PH1 is provided in which the first period P1 and the second period P2 are alternately repeated. That is, the control section 40 controls the discharge lamp driving section 230 to provide the first period P1, the second period P2, the third period P3, the fourth period P4, and the mixed period PH1. The number of first periods P1 and the number of second periods P2 in the mixed period PH1 are not particularly limited.

The first period P1 is a period in which the alternating current driving is executed. The second period P2 is a period in which the direct current driving is executed. The third period P3 is a period in which the biased driving is executed. The fourth period P4 is a period in which the low frequency alternating current driving is executed. In this way, the driving cycle C1 is executed by the control section 40 performing the four kinds of driving. The mixed period PH1 is a period in which the mixed driving is executed. In this embodiment, a plurality of the mixed period PH1 are provided in one driving cycle C1. The periods are explained in detail below.

Figure 8:
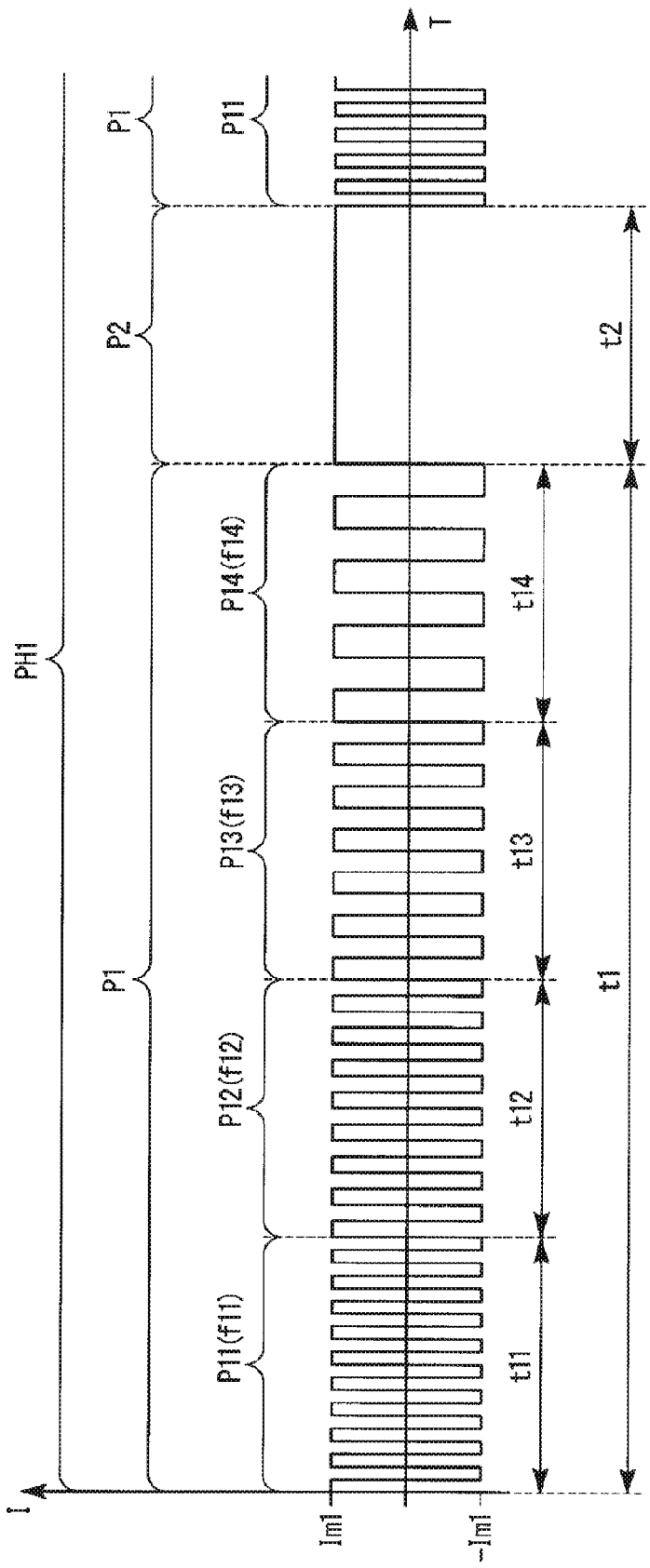
FIG. 8 is a diagram showing an example of a driving current waveform in a mixed period in the embodiment.

FIG. 8 is a diagram showing an example of a driving current waveform of the mixed period PH1. In FIG. 8, the vertical axis indicates the driving current I and the horizontal axis indicates time T. The driving current I is shown as positive in the first polarity state and is shown as negative in the second polarity state.

As shown in FIG. 8, the first period P1 is a period in which an alternating current having a first frequency f1 is supplied to the discharge lamp 90. In this embodiment, the first period P1 includes a first alternating current period (an alternating current period) P11, a second alternating current period (an alternating current period) P12, a third alternating current period (an alternating current period) P13, and a fourth alternating current period (an alternating current period) P14. The first alternating current period P11, the second alternating current period P12, the third alternating current period P13, and the fourth alternating current period P14 are continuously provided in this order.

In this embodiment, an alternating current in the first alternating current period P11, the second alternating current period P12, a third alternating current period P13, and the fourth alternating current period P14 is, for example, a rectangular wave alternating current, the polarity of which is inverted a plurality of times between a current value Im1 and a current value −Im1.

The first frequency f1 in the first alternating current period P11, a first frequency f12 in the second alternating current period P12, a first frequency f13 in the third alternating current period P13, and a first frequency f14 in the fourth alternating current period P14 are different from one another. That is, in this embodiment, the first frequency f1 includes a plurality of frequencies different from one another. The first period P1 includes a plurality of alternating current periods in which frequencies of alternating currents supplied to the discharge lamp 90 are different from one another.

The first frequency f11, the first frequency f12, the first frequency f13, and the first frequency f14 become smaller in this order. That is, in the first period P1, a frequency of an alternating current is smaller in an alternating current period provided temporally later.

In this embodiment, the control section 40 sets the first frequencies f11 to f14 on the basis of both of the lamp voltage Vla detected by the voltage detecting section in the operation detecting section 60 and driving power Wd supplied to the discharge lamp 90. That is, in this embodiment, the control section 40 sets the first frequencies f11 to f14 on the basis of at least one of the lamp voltage Vla and the driving power Wd. That is, in this embodiment, the control section 40 changes the first frequencies f11 to f14 on the basis of at least one of the lamp voltage Vla and the driving power Wd.

Figure 9:
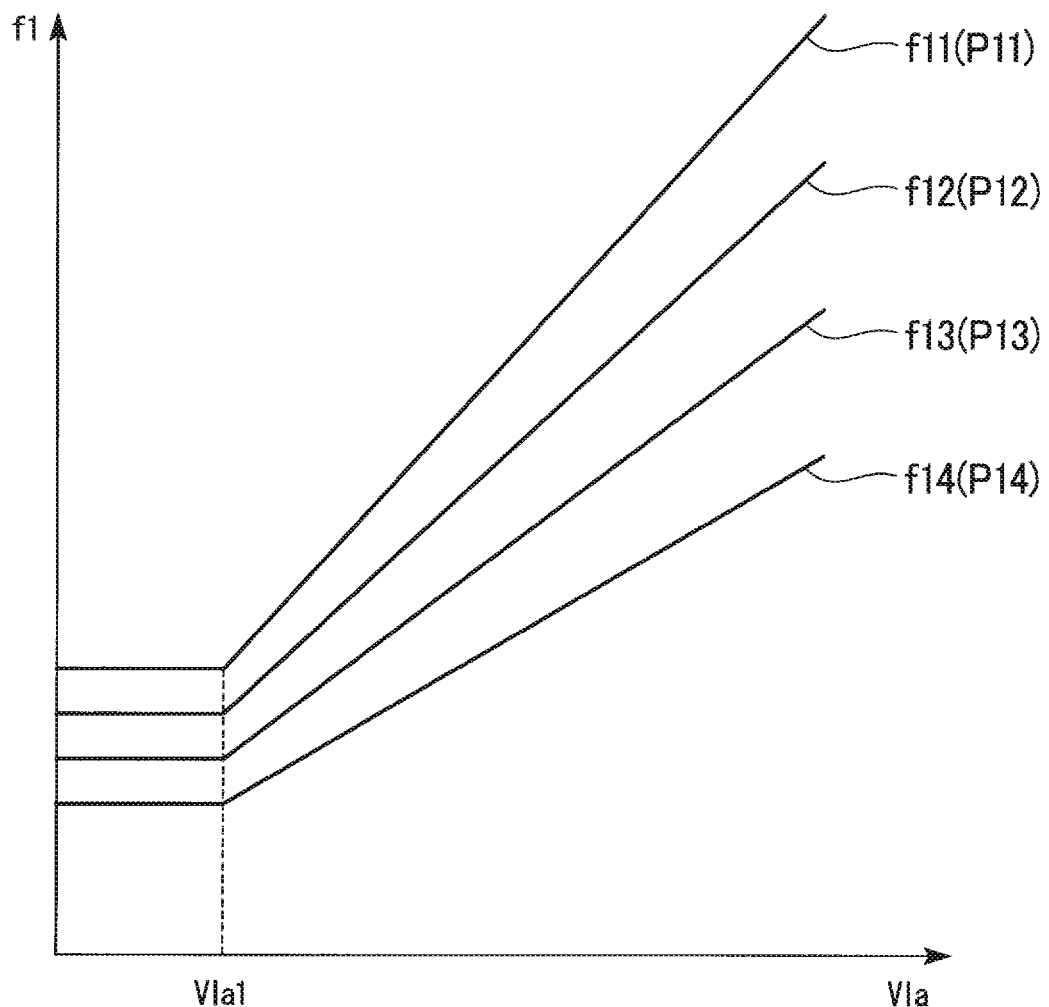
FIG. 9 is a graph showing an example of a relation between a lamp voltage and a first frequency in the embodiment.

FIG. 9 is a graph showing an example of a relation between the lamp voltage Vla and the first frequencies f11 to f14. In FIG. 9, the vertical axis indicates the first frequency f1 and the horizontal axis indicates the lamp voltage Vla. FIG. 9 shows a relation between the lamp voltage Vla and the first frequencies f11 to f14 at the time when the driving power Wd is a fixed value.

In the example shown in FIG. 9, in a range in which a value of the lamp voltage Vla is smaller than a predetermined value Vla1, the first frequencies f11 to f14 are fixed. In the example shown in FIG. 9, in a range in which the value of the lamp voltage Vla is equal to or larger than the predetermined value Vla1, the first frequencies f11 to f14 are set larger as the lamp voltage Vla is larger. In the range in which the value of the lamp voltage Vla is equal to or larger than the predetermined value Vla1, a relation between the first frequencies f11 to f14 and the lamp voltage Vla is represented by, for example, a linear function.

In the example shown in FIG. 9, a tilt of a change in the first frequency f1 with respect to the lamp voltage Vla in a range in which the value of the lamp voltage Vla is equal to or larger than the predetermined value Vla1 increases in the order of the first frequency f14, the first frequency f13, the first frequency f12, and the first frequency f11. That is, as the lamp voltage Vla is larger, a difference among the values of the first frequencies f11 to f14 increases.

Figure 10:
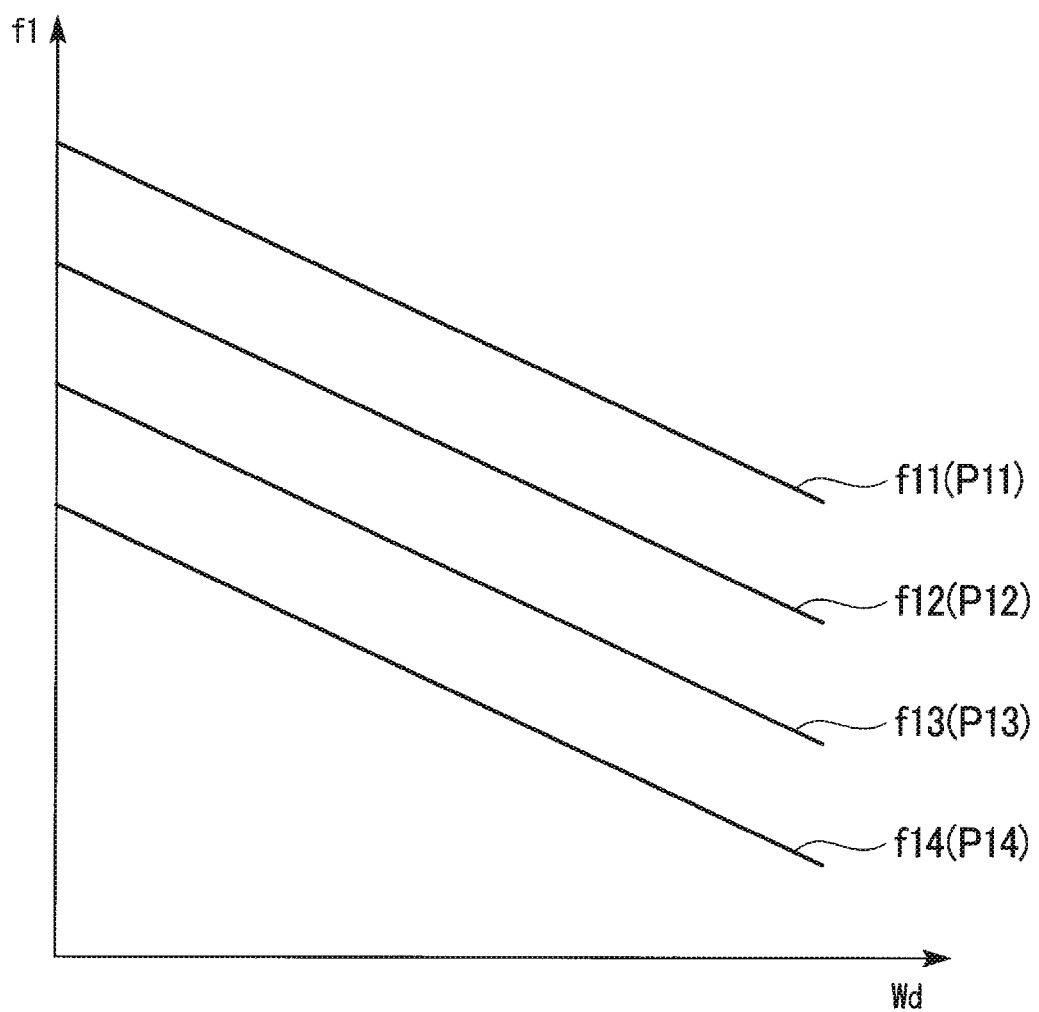
FIG. 10 is a graph showing an example of a relation between driving power and the first frequency in the embodiment.

FIG. 10 is a graph showing an example of a relation between the driving power Wd and the first frequencies f11 to f14. In FIG. 10, the vertical axis indicates the first frequency f1 and the horizontal axis indicates the driving power Wd. FIG. 10 shows a relation between the driving power Wd and the first frequencies f11 to f14 at the time when the lamp voltage Vla is a fixed value.

In the example shown in FIG. 10, the first frequencies f11 to f14 are set larger as the driving power Wd is smaller. A relation between the first frequencies f11 to f14 and the driving power Wd is represented by, for example, a linear function. In the example shown in FIG. 10, a tilt of a change in the first frequency f1 with respect to the driving power Wd is the same, for example, at all of the first frequencies f11 to f14.

In this embodiment, the first frequency f1 is set on the basis of both of a change in the first frequency f1 with respect to the lamp voltage Vla shown in FIG. 9 and a change in the first frequency f1 with respect to the driving power Wd. Specifically, for example, a value of the first frequency f1 is set by, for example, adding or subtracting a change in the first frequency f1 due to a change in the driving power Wd to or from a value of the first frequency f1 set with respect to the lamp voltage Vla. The value of the first frequency f1 is, for example, equal to or larger 50 Hz and equal to or smaller than 50 kHz.

Note that, in this specification, "the first frequency f1 is set larger as the lamp voltage Vla is larger" may be only within a predetermined range of the value of the lamp voltage Vla as in the example shown in FIG. 9 or may be within all ranges that the value of the lamp voltage Vla can take.

In this specification, "the first frequency f1 is set larger as the driving power Wd is smaller" may be within all ranges that a value of the driving power Wd can take as in the example shown in FIG. 10 or may be only within a predetermined range of the value of the driving power Wd.

In this specification, "the first frequency f1 is set larger as the lamp voltage Vla is larger" includes the first frequency f1 being set in this way when the driving power Wd is fixed. In this specification, "the first frequency f1 is set larger as the driving power Wd is smaller" includes the first frequency f1 being set in this way when the lamp voltage Vla is fixed.

That is, for example, when the first frequency f1 is set on the basis of both of the lamp voltage Vla and the driving power Wd as in this embodiment, the actual first frequency f1 sometimes decreases because the driving power Wd increases even when the lamp voltage Vla increases. The actual first frequency f1 sometimes increases because the lamp voltage Vla decreases even when the driving power Wd increases.

In this embodiment, a start polarity of the first period P1 is, for example, a polarity opposite to an end polarity of a period provided immediately before the first period P1. The start polarity is the polarity of the driving current I at a point in time when a certain period is started. The end polarity is the polarity of the driving current I at a point in time when a certain period ends.

Specifically, for example, when the polarity of a direct current supplied to the discharge lamp 90 in the second period P2 provided immediately before the first period P1 is a second polarity, an end polarity of the second period P2 is the second polarity. Therefore, the start polarity of the first period P1 is a first polarity. For example, when an end polarity of the fourth period P4 immediately before the first period P1 is the first polarity, the start polarity of the first period P1 is the second polarity. In this embodiment, the start polarity of the first period P1 is a start polarity of the first alternating current period P11.

As shown in FIG. 8, in this embodiment, length t11 of the first alternating current period P11, length t12 of the second alternating current period P12, length t13 of the third alternating current period P13, and length t14 of the fourth alternating current period P14 are, for example, the same. A frequency T1 of an alternating current included in the alternating current periods is set, for example, on the basis of both of the lamp voltage Vla and the driving power Wd. The frequency T1 of the alternating current included in the alternating current periods in this embodiment is set, for example, on the basis of the first frequency f1 set on the basis of both of the lamp voltage Vla and the driving power Wd.

In this embodiment, length t1 of the first period P1, that is, total length of the lengths t11 to t14 is, for example, equal to or larger than 10 ms (milliseconds) and equal to or smaller than 10 s (seconds). Since the length t1 of the first period P1 is set in this way, it is possible to suitably apply a heat load to the protrusion 552p of the first electrode 92 and the protrusion 562p of the second electrode 93.

That is, a frequency T11 in the first alternating current period P11 shown in FIG. 8 is set on the basis of the first frequency f11. A frequency T12 in the second alternating current period P12 is set on the basis of the first frequency f12. A frequency T13 in the third alternating current period P13 is set on the basis of the first frequency f13. A frequency T14 in the fourth alternating current period P14 is set on the basis of the first frequency f14. Specifically, for example, values obtained by multiplying the first frequencies f1 with the lengths of the periods are frequencies.

The second period P2 is a period in which a direct current is supplied to the discharge lamp 90. In the example shown in FIG. 8, in the second period P2, the driving current I having the first polarity and a constant current value Im1 is supplied to the discharge lamp 90. The polarity of the direct current supplied to the discharge lamp 90 in the second period P2 of the mixed period PH1 is inverted every time the second period P2 is provided.

That is, in the mixed period PH1 shown in FIG. 7, polarities are different from each other in a direct current in the second period P2 provided immediately before the first period P1 and a direct current in the second period P2 provided immediately after the first period P1. For example, when the polarity of the direct current in the second period P2 provided immediately before the first period P1 is the first polarity like the direct current in the second period P2 shown in FIG. 8, the polarity of the direct current in the second period P2 provided immediately after the first period P1 is the second polarity opposite to the first polarity. In this case, in the second period P2 provided immediately after the first period P1, the driving current I having the second polarity and a constant current value −Im is supplied to the discharge lamp 90.

Length t2 of the second period P2 shown in FIG. 8 is larger than the length of a half cycle of the alternating current having the first frequency f11 in the first period P1. The length t2 of the second period P2 is, for example, equal to or larger than 10 ms (milliseconds) and equal to or smaller than 20 ms (milliseconds). Since the length t2 of the second period P2 is set in this way, it is possible to suitably apply a heat load to the protrusion 552*p* of the first electrode 92.

In this embodiment, the control section 40 sets the length t2 of the second period P2 on the basis of both of the lamp voltage Vla and the driving power Wd. That is, in this embodiment, the control section 40 sets the length t2 of the second period P2 on the basis of at least one of the lamp voltage Vla and the driving power Wd. In other words, in this embodiment, the control section 40 changes the length t2 of the second period P2 on the basis of at least one of the lamp voltage Vla and the driving power Wd. For example, the length t2 of the second period P2 is set larger as the lamp voltage Vla is larger. For example, the length t2 of the second period P2 is set smaller as the driving power Wd is larger.

When the driving power Wd is fixed, a relation between the length t2 of the second period P2 and the lamp voltage Vla can be represented by, for example, a linear function. When the lamp voltage Vla is fixed, a relation between the length t2 of the second period P2 and the driving power Wd can be represented by, for example, a linear function.

Note that, in this specification, "the length t2 of the second period P2 is set larger as the lamp voltage Vla is larger" may be only within a predetermined range of the value of the lamp voltage Vla or may be within all ranges that the value of the lamp voltage Vla can take.

In this specification, "the length t2 of the second period P2 is set smaller as the driving power Wd is larger" may be only within a predetermined range of the value of the driving power Wd or may be within all ranges that the value of the driving power Wd can take.

That is, when the lamp voltage Vla is equal to or smaller than a predetermined value, for example, the length t2 of the second period P2 may be fixed. When the driving power Wd is equal to or smaller than a predetermined value, for example, the length t2 of the second period P2 may be fixed.

In this specification, "the length t2 of the second period P2 is set larger as the lamp voltage Vla is larger" includes the length t2 being set in this way when the driving power Wd is fixed. In this specification, "the length t2 of the second period P2 is set smaller as the driving power Wd is larger" includes the length t2 being set in this way when the lamp voltage Vla is fixed.

That is, for example, when the length t2 of the second period P2 is set on the basis of both of the lamp voltage Vla and the driving power Wd as in this embodiment, the actual length t2 of the second period P2 sometimes decreases because the driving power Wd increases even when the lamp voltage Vla increases. The actual length t2 of the second period P2 sometimes increases because the lamp voltage Vla decreases even when the driving power Wd increases.

As shown in FIG. 7, the third period P3 is provided between the mixed periods PH1 temporally adjacent to each other. The third period P3 is provided, for example, immediately after the first period P1. The third period P3 is provided, for example, immediately before the first period P1. That is, the third period P3 is provided, for example, between the first periods P1.

Figure 11:
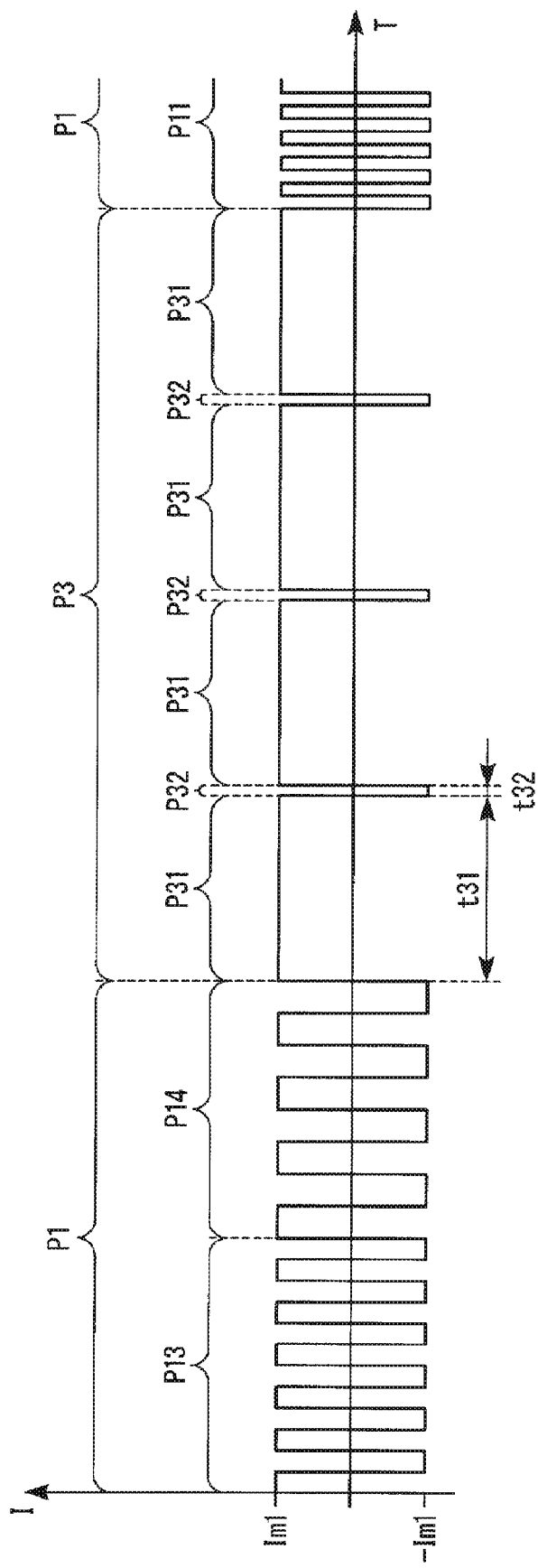
FIG. 11 is a diagram showing an example of a driving current waveform in a third period in the embodiment.

FIG. 11 is a diagram showing an example of a driving current wave form in the third period P3. In FIG. 11, the vertical axis indicates the driving current I and the horizontal axis indicates the time T. The driving current I is shown as positive in the first polarity state and is shown as negative in the second polarity state.

As shown in FIG. 11, the third period P3 is a period alternately including a first direct current period P31 and a second direct current period P32. The first direct current period P31 is a period in which a direct current is supplied to the discharge lamp 90. In the example shown in FIG. 11, in the first direct current period P31, the driving current I having the first polarity and the constant current value Im1 is supplied to the discharge lamp 90.

The second direct current period P32 is a period in which a direct current having a polarity opposite to the polarity of the direct current supplied to the discharge lamp 90 in the first direct current period P31 is supplied to the discharge lamp 90. That is, in the example shown in FIG. 11, in the second direct current period P32, the driving current I having the second polarity and the constant current value −Im1 is supplied to the discharge lamp 90.

The polarity of the direct current supplied to the discharge lamp 90 in the first direct current period P31 and the polarity of the direct current supplied to the discharge lamp 90 in the second direct current period P32 are inverted every time the third period P3 is provided. That is, in the third period P3 provided following the third period P3 shown in FIG. 11, the polarity of the direct current supplied to the discharge lamp 90 in the first direct current period P31 is the second polarity and the polarity of the direct current supplied to the discharge lamp 90 in the second direct current period P32 is the first polarity.

Length t31 of the first direct current period P31 is larger than length t32 of the second direct current period P32. The length t31 of the first direct current period P31 is ten times or more as large as the length t32 of the second direct current period P32. Since the length t31 of the first direct current period P31 is set in this way, in the third period P3, it is possible to suitably suppress, while suitably heating one electrode, the temperature of the other electrode from excessively dropping.

Length t31 of the first direct current period P31 is, for example, equal to or larger than 5.0 ms (milliseconds) and equal to or smaller than 20 ms (milliseconds). Length t32 of the second direct current period P32 is smaller than 0.5 ms (milliseconds).

A total of the lengths t31 of the first direct current periods P31 in the third period P3 is larger than the length t2 of the second period P2 and larger than the length of a half cycle of an alternating current in the fourth period P4, that is, an alternating current having a second frequency f2 explained below. The total of the length t31 of the first direct current periods P31 in the third period P3 is length obtained by adding up the lengths t31 of the all the first direct current periods P31 included in the third period P3. In the example shown in FIG. 11, for example, four first direct current periods P31 are included in the third period P3. Therefore, the total of the lengths t31 of the first direct current periods P31 in the third period P3 is length obtained by adding up the lengths t31 of the four first direct current periods P31.

The total of the lengths t31 of the first direct current periods P31 in the third period P3 is, for example, equal to or larger than 10 ms (milliseconds) and equal to or smaller than 1.0 s (seconds). Since the total of the lengths t31 of the first direct current periods P31 in the third period P3 is set in this way, it is possible to suitably increase a heat load applied to the protrusion 552p of the first electrode 92.

Note that, in the following explanation, the total of the lengths t31 of the first direct current periods P31 in the third period P3 is sometimes simply referred to as total length of the first direct current periods P31.

The lengths t31 of the first direct current periods P31 may be the same or may be different from one another. In the example shown in FIG. 11, the lengths t31 of the first direct current periods P31 are the same.

In this embodiment, the control section 40 sets the total length of the first direct current periods P31 on the basis of both of the lamp voltage Vla and the driving power Wd. That is, in this embodiment, the control section 40 sets the total length of the first direct current periods P31 on the basis of at least one of the lamp voltage Vla and the driving power Wd. In other words, in this embodiment, the control section 40 changes the total length of the first direct current periods P31 on the basis of at least one of the lamp voltage Vla and the driving power Wd. For example, the total length of the first direct current periods P31 is set larger as the lamp voltage Vla is larger. For example, the total length of the first direct current periods P31 is set smaller as the driving power Wd is larger.

When the driving power Wd is fixed, a relation between the total length of the first direct current periods P31 and the lamp voltage Vla can be represented by, for example, a linear function. When the lamp voltage Vla is fixed, a relation between the total length of the first direct current periods P31 and the driving power Wd can be represented by, for example, a linear function.

Note that, in this specification, "the total of the lengths t31 of the first direct current periods P31 in the third period P3 is set larger as the lamp voltage Vla is larger" may be only within a predetermined range of the value of the lamp voltage Vla or may be within all ranges that the value of the lamp voltage Vla can take.

In this specification, "the total of the lengths t31 of the first direct current periods P31 in the third period P3 is set smaller as the driving power Wd is larger" may be only within a predetermined range of the value of the driving power Wd or may be within all ranges that the value of the driving power Wd can take.

That is, when the lamp voltage Vla is equal to or smaller than the predetermined value, for example, the total length of the first direct current periods P31 may be fixed. When the driving power Wd is equal to or smaller than the predetermined value, for example, the total length of the first direct current periods P31 may be fixed.

In this specification, "the total of the lengths t31 of the first direct current periods P31 in the third period P3 is set larger as the lamp voltage Vla is larger" includes the total being set in this way when the driving power Wd is fixed. In this specification, "the total of the lengths t31 of the first direct current periods P31 in the third period P3 is set smaller as the driving power Wd is larger" includes the total being set in this way when the lamp voltage Vla is fixed.

That is, for example, when the total length of the first direct current periods P31 is set on the basis of both of the lamp voltage Vla and the driving power Wd as in this embodiment, the actual total length of the first direct current periods P31 sometimes decreases because the driving power Wd increases even when the lamp voltage Vla increases. The actual total length of the first direct current periods P31 sometimes increases because the lamp voltage Vla decreases even when the driving power Wd increases.

The number of the first direct current periods P31 included in the third period P3 is determined, for example, on the basis of the total length of the first direct current periods P31. The number of the first direct current periods P31 is determined such that the set total length of the first direct current periods P31 can be realized, for example, within a range in which the lengths t31 of the first direct current periods P31 are equal to or smaller than a predetermined value. That is, for example, the number of the first direct current periods P31 included in the third period P3 is larger as the total length of the first direct current periods P31 is larger.

Specifically, for example, when the predetermined value is set as 20 ms (milliseconds), when the total length of the first direct current periods P31 is larger than 20 ms (milliseconds) and equal to or smaller than 40 ms (milliseconds), the number of the first direct current periods P31 included in the third period P3 is two. When the total length of the first direct current periods P31 is larger than 40 ms (milliseconds) and equal to or smaller than 60 ms (milliseconds), the number of the first direct current periods P31 included in the third period P3 is three.

In the example shown in FIG. 11, the number of the first direct current periods P31 included in the third period P3 is four. That is, for example, when the predetermined value is set as 20 ms (milliseconds), that total length of the first direct current periods P31 is larger than 60 ms (milliseconds) and equal to or smaller than 80 ms (milliseconds).

By setting the total length as explained above, it is possible to realize the set total length of the first direct current periods P31 while setting the lengths t31 of the first direct current period P31 to the predetermined value (20 ms) or less.

As shown in FIG. 7, in this embodiment, the fourth period P4 is provided between the mixed periods PH1 temporally adjacent to each other. The fourth period P4 is provided, for example, immediately after the first period P1. The fourth period P4 is provided, for example, immediately before the first period P1. That is, the fourth period P4 is provided, for example, between the first periods P1.

Figure 12:
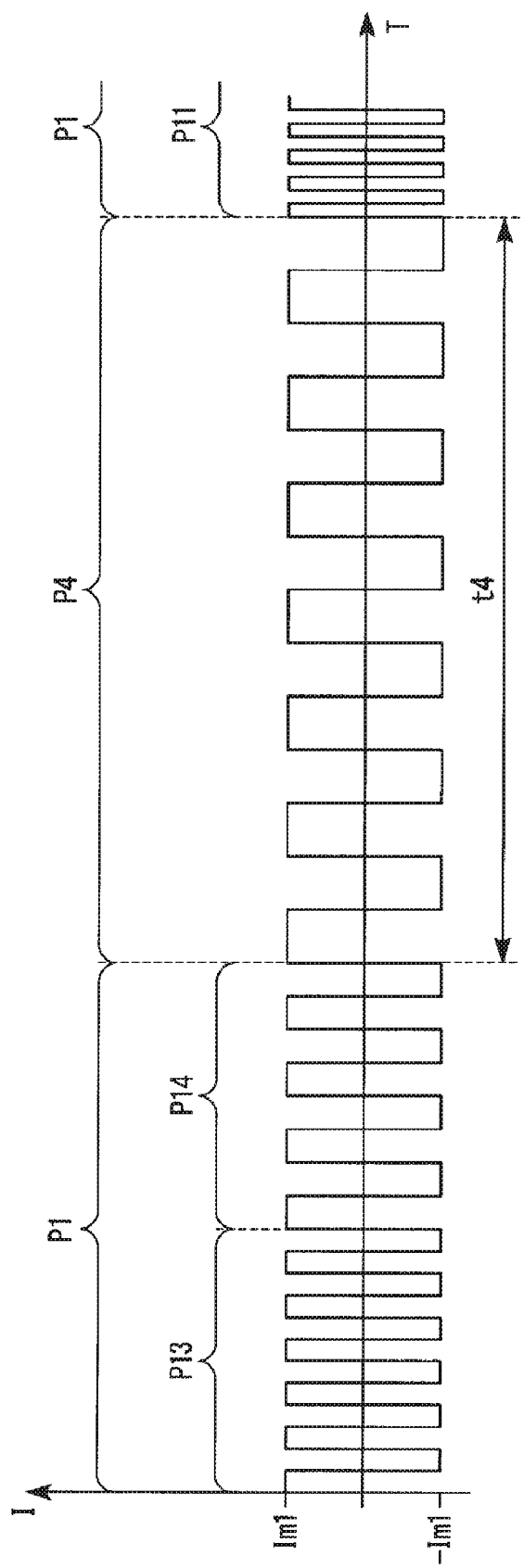
FIG. 12 is a diagram showing an example of a driving current waveform in a fourth period in the embodiment.

FIG. 12 is a diagram showing an example of a driving current waveform in the fourth period P4. In FIG. 12, the vertical axis indicates the driving current I and the horizontal axis indicates the time T. The driving current I is shown as positive in the first polarity state and is shown as negative in the second polarity state.

As shown in FIG. 12, the fourth period P4 is a period in which an alternating current having the second frequency f2 smaller than the first frequency f1 is supplied to the discharge lamp 90. That is, the second frequency f2 of the alternating current in the fourth period P4 is smaller than all of the first frequencies f11 to f14. A value of the second frequency f2 is, for example, equal to or larger than 10 Hz and equal to or smaller than 100 Hz.

A start polarity of the fourth period P4 is inverted every time the fourth period P4 is provided. In the example shown in FIG. 12, the start polarity of the fourth period P4 is, for example, the first polarity. Therefore, in the fourth period P4 provided following the fourth period P4 shown in FIG. 12, the start polarity is the second polarity.

Length t4 of the fourth period P4 is larger than, for example, the length t2 of the second period P2. The length t4 of the fourth period P4 is equal to or larger than length of six cycles and equal to or smaller than length of a thirty cycles of the alternating current having the second frequency f2. Since the length t4 of the fourth period P4 is set in this way, it is possible to suitably adjust the shape of the protrusion 552p of the first electrode 92.

As explained above, in this embodiment, the third period P3 and the fourth period P4 are provided between the mixed periods PH1 temporally adjacent to each other. In this embodiment, the third period P3 and the fourth period P4 are cyclically provided along a fixed pattern. This is explained in detail below.

Figure 13:
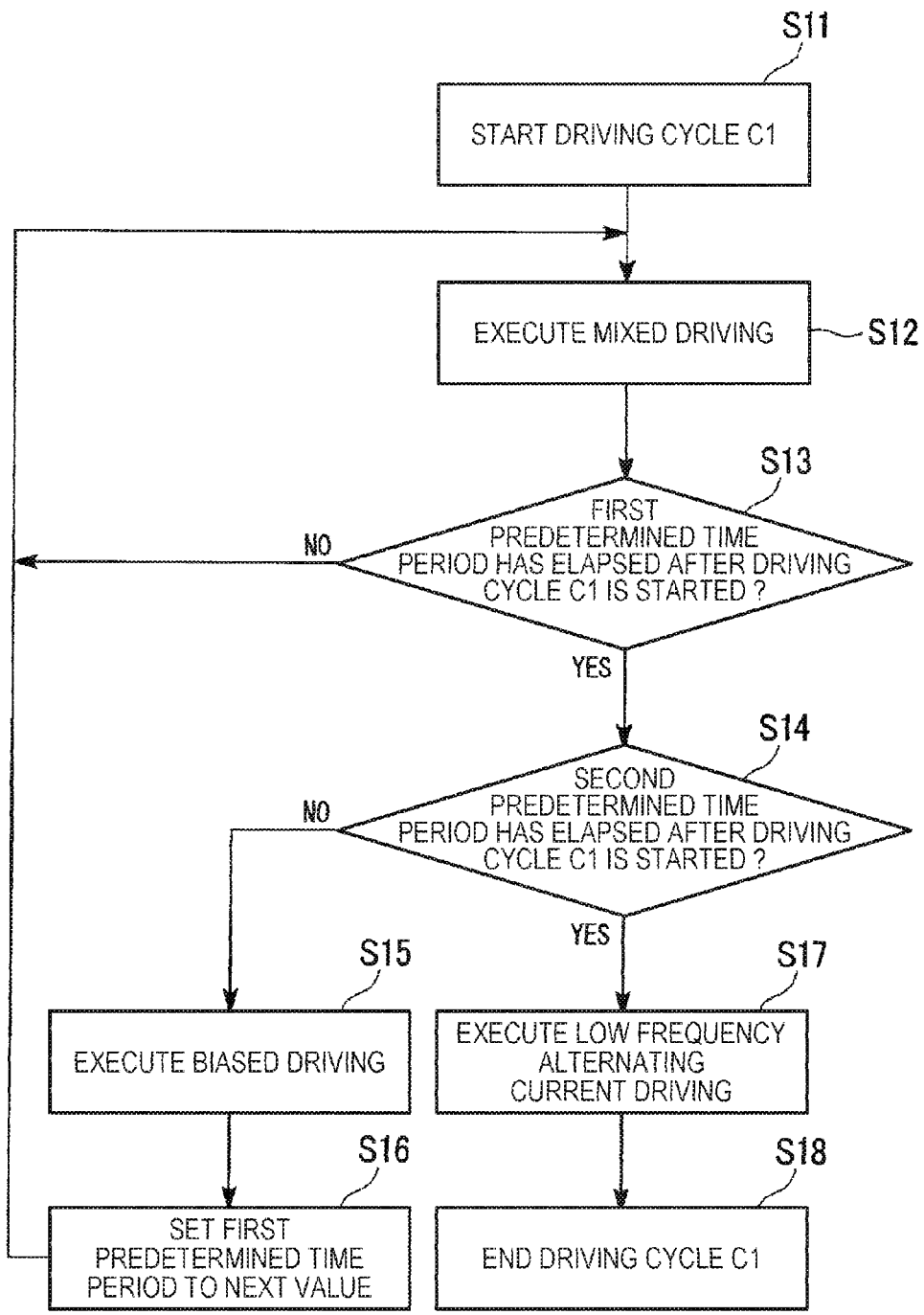
FIG. 13 is a flowchart showing an example of a control procedure for a discharge lamp driving section by a control section in the embodiment.

FIG. 13 is a flowchart showing an example of control in the driving cycle C1 by the control section 40 in this embodiment. As shown in FIG. 13, after starting the driving cycle C1 (step S11), first, the control section 40 executes the mixed driving (step S12). Consequently, the mixed period PH1 is started. The control section 40 determines whether a first predetermined time period has elapsed after the driving cycle C1 is started (step S13).

The first predetermined time period is a time period from a point in time when the driving cycle C1 is started until first predetermined time. In this embodiment, a plurality of the first predetermined times are set at equal intervals.

Therefore, in this embodiment, a plurality of the first predetermined time periods are provided.

Specifically, for example, in this embodiment, predetermined times are set at every 30 s (seconds). That is, the first predetermined times are times of 30 s (seconds), 60 s (seconds), and 90 s (seconds) starting from the point in time when the driving cycle C1 is started. That is, the first predetermined time periods are, for example, 30 s (second), 60 s (seconds), and 90 s (seconds). Immediately after the driving cycle C1 is started, the first predetermined time period is set to an initial value (30 s).

When the first predetermined time period has not elapsed after the driving cycle C1 is started (NO in step S13), the control section 40 continues the mixed driving. On the other hand, when the first predetermined time period has elapsed after the driving cycle C1 is started (YES in step S13), the control section 40 determines whether a second predetermined time period has elapsed after the driving cycle C1 is started (step S14).

The second time period is a time period from the point in time when the driving cycle C1 is started until second predetermined time. The second predetermined time is, for example, time of 90 s (seconds) starting from the point in time when the driving cycle C1 is started. That is, the second predetermined time period is, for example, 90 s (seconds). The second predetermined time period is larger than the initial value (e.g., 30 s) of the first predetermined time period.

When the second predetermined time period has not elapsed after the driving cycle C1 is started (NO in step S14), the control section 40 executes the biased driving (step S15). Consequently, the third period P3 is started. After the third period P3 ends, the control section 40 sets the first predetermined time period to the next value (60 s) (step S16) and executes the mixed driving again (step S12).

On the other hand, when the second predetermined time period has elapsed after the driving cycle C1 is started (YES in step S14), the control section 40 executes the low frequency alternating current driving (step S17). Consequently, the fourth period P4 is started. After the fourth period P4 ends, the control section 40 ends the driving cycle C1 (step S18).

As explained above, for example, when the initial first predetermined time period (30 s) has elapsed after the driving cycle C1 is started and when the next first predetermined time period (60 s) has elapsed after the driving cycle C1 is started, the biased driving is executed and the third period P3 is provided.

On the other hand, when the second next first predetermined time period (90 s) has elapsed after the driving cycle C1 is started, since the second predetermined time period (90 s) also has elapsed, the low frequency alternating current driving is executed and the fourth period P4 is provided.

In this way, the third period P3 and the fourth period P4 are cyclically provided along a fixed pattern. That is, in this embodiment, the control section 40 controls the discharge lamp driving section 230 such that one of the third period P3 and the fourth period P4 is provided at every first predetermined interval, that is, 30 s (seconds) in the above example, and the fourth period P4 is provided at every second predetermined interval, that is, 90 s (seconds) in the above example. The second predetermined interval is larger than the first predetermined interval.

In the above example, after two third periods P3 are provided at every 30 s (seconds), the fourth period P4 is provided. That is, the two third periods P3 are provided from the time when the fourth period P4 is provided until the next fourth period P4 is provided. The polarity of a direct current supplied to the discharge lamp 90 in the first direct current period P31 in the third period P3 and the polarity of a direct current supplied to the discharge lamp 90 in the second direct current period P32 in the third period P3 are inverted every time the third period P3 is provided. Therefore, in the two third periods P3 provided between the fourth periods P4 temporally adjacent to each other, the polarities of the driving current I supplied to the discharge lamp 90 are opposite to each other.

That is, in this embodiment, the control section 40 controls the discharge lamp driving section 230 to provide, at the second predetermined interval at which the fourth period P4 is provided, the two third periods P3, that is, the third period P3 alternately including the first direct current period P31 in which a direct current having the first polarity is supplied to the discharge lamp 90 and the second direct current period P32 in which a direct current having the second polarity is supplied to the discharge lamp 90 and the third period P3 alternately including the first direct current period P31 in which a direct current having the second polarity is supplied to the discharge lamp 90 and the second direct current period P32 in which a direct current having the first polarity is supplied to the discharge lamp 90. In other words, the two third periods P3 are provided in a period between the fourth periods P4 temporally adjacent to each other.

Figure 14:
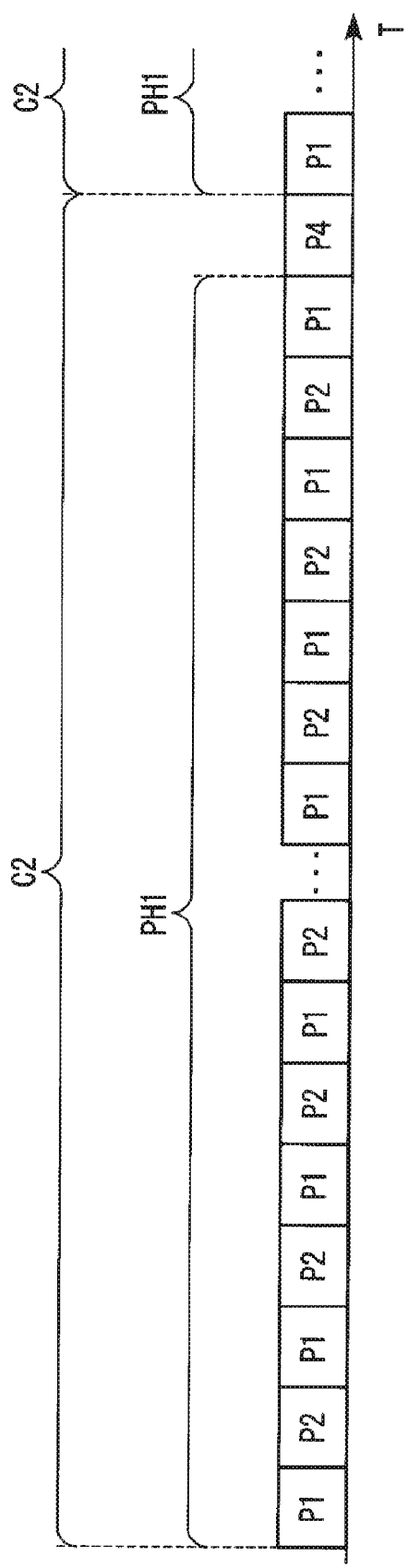
FIG. 14 is a schematic diagram showing a change in a period in which a driving current is supplied to the discharge lamp in the embodiment.

The driving cycle C2 is explained. FIG. 14 shows an example in which the discharge lamp driving section 230 is controlled such that the driving cycle C2 is repeated. As shown in FIG. 14, in this embodiment, the driving cycle C2 includes the first period P1, the second period P2, and the fourth period P4. The driving cycle C2 in this embodiment is different from the driving cycle C1 in that the third period P3 is not provided.

In the example shown in FIG. 14, the driving cycle C2 includes one mixed period PH1 and the fourth period P4 provided immediately after the mixed period PH1. Consequently, since the driving cycle C2 is repeated, the mixed period PH1 and the fourth period P4 are alternately repeated. Like the driving cycle C1, the fourth period P4 is provided at every second predetermined interval (e.g., 90 s (seconds)).

Figure 15:
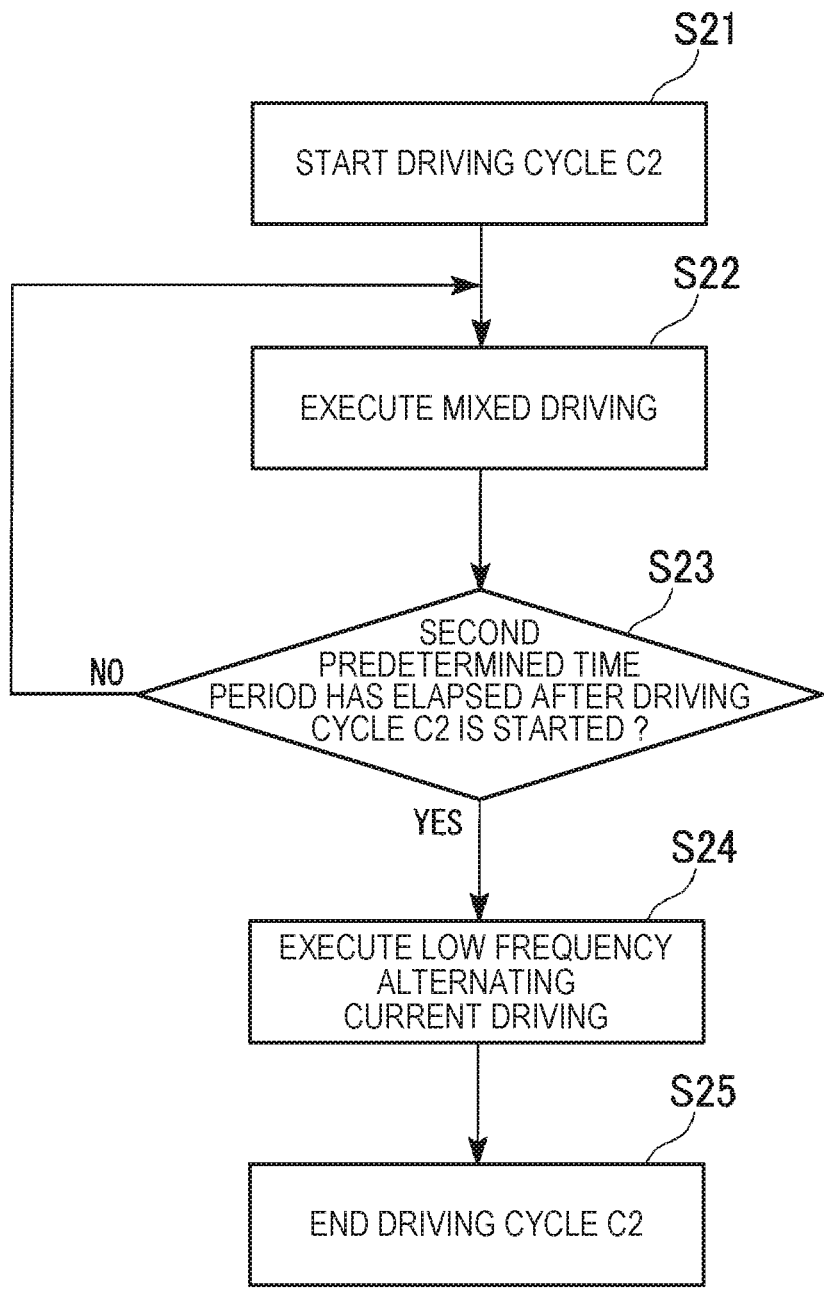
FIG. 15 is a flowchart showing an example of a control procedure for the discharge lamp driving section by the control section in the embodiment.

FIG. 15 is a flowchart showing an example of control in the driving cycle C2 by the control section 40 in this embodiment. As shown in FIG. 15, after starting the driving cycle C2 (step S21), first, the control section 40 executes the mixed driving (step S22). Consequently, the mixed period PH1 is started. The control section 40 determines whether the second predetermined time period has elapsed after the driving cycle C2 is started (step S23).

When the second predetermined time period has not elapsed after the driving cycle C2 is started (NO in step S23), the control section 40 continues the mixed driving. On the other hand, when the second predetermined time period has elapsed after the driving cycle C2 is started (YES in step S23), the control section 40 executes the low frequency alternating current driving (step S24). Consequently, the fourth period P4 is started. After the fourth period P4 ends, the control section 40 ends the driving cycle C2 (step S25).

Figure 16:
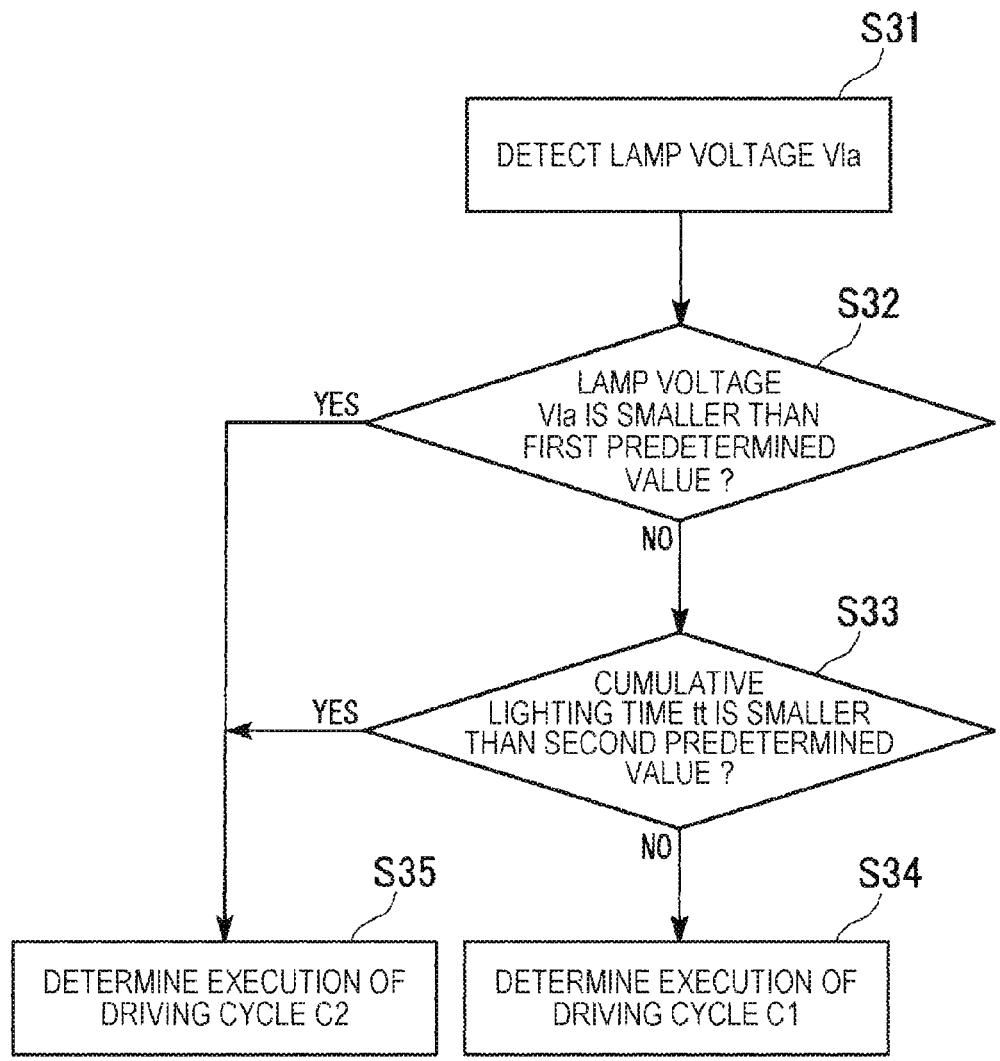
FIG. 16 is a flowchart showing an example of a procedure for determining a driving cycle by the control section according to the embodiment.

A determination procedure for the driving cycle C1 and the driving cycle C2 by the control section 40 is explained. FIG. 16 is a flowchart showing an example of a procedure for determining a driving cycle by the control section 40 in this embodiment. As shown in FIG. 16, the control section 40 causes the voltage detecting section of the operation detecting section 60 to detect the lamp voltage Vla (step S31). The control section 40 determines whether the detected lamp voltage Vla is smaller than a first predetermined value (step S32). The first predetermined value is, for example, approximately equal to or larger than 65 V and equal to or smaller than 75 V.

When the lamp voltage Vla is smaller than the first predetermined value (YES in step S32), the control section 40 determines to execute the driving cycle C2 (step S35). On the other hand, when the lamp voltage Vla is equal to or larger than the first predetermined value (NO in step S32), the control section 40 determines whether the cumulative lighting time tt is smaller than a second predetermined value (step S33). The second predetermined value is, for example, approximately equal to or larger than 80 h (hours) and equal to or smaller than 150 h (hours).

When the cumulative lighting time tt is smaller than the second predetermined value (YES in step S33), the control section 40 determines to execute the driving cycle C2 (step S35). On the other hand, when the cumulative lighting time tt is equal to or larger than the second predetermined value (NO in step S33), the control section 40 determines to execute the driving cycle C1 (step S34). Note that, in this specification, the cumulative lighting time is a sum of times in which the discharge lamp is lit.

As explained above, when the lamp voltage Vla is smaller than the first predetermined value or when the cumulative lighting time tt is smaller than the second predetermined value, the control section 40 executes the driving cycle C2 in which the third period P3 is not provided. In other words, when the lamp voltage Vla is smaller than the first predetermined value and when the cumulative lighting time tt of the discharge lamp 90 is smaller than the second predetermined value, the control section 40 does not provide the third period P3. On the other hand, when the lamp voltage Vla is equal to or larger than the first predetermined value and the cumulative lighting time tt is equal to or larger than the second predetermined value, the control section 40 executes the driving cycle C1.

Specifically, for example, when the first predetermined value is 70 V and the initial lamp voltage Vla of the discharge lamp 90 is 65 V, at an initial stage, the control section 40 drives the discharge lamp 90 in the driving cycle C2. When the lamp voltage Vla rises to be equal to or larger than the first predetermined value (70 V) according to use of the projector 500 and the cumulative lighting time tt is equal to or larger than the second predetermined value (100 h (hours)), the control section 40 changes the driving cycle from the driving cycle C2 to the driving cycle C1 and drives the discharge lamp 90 in the driving cycle C1.

Note that, in this embodiment, when the lamp voltage Vla rises to be equal to or larger the first predetermined value, when the cumulative lighting time tt is smaller than the second predetermined value, the control section 40 continues to drive the discharge lamp 90 in the driving cycle C2. When the cumulative lighting time tt increases to be equal to or larger than the second predetermined time, the control section 40 changes the driving cycle from the driving cycle C2 to the driving cycle C1.

For example, after starting the projector 500, the control section 40 determines the driving cycle in a startup period until the discharge lamp 90 is steadily lit. In the startup period, the lamp voltage Vla applied to the discharge lamp 90 gradually rises to the lamp voltage Vla at steady lighting time. Therefore, when determining the driving cycle in the startup period, the control section 40 estimates a value of the lamp voltage Vla at the steady lighting time from the detected lamp voltage Vla and determines whether the value is smaller than the first predetermined value.

Note that the control section 40 may periodically determine the driving cycle even after the discharge lamp 90 is steadily lit. In this case, the driving cycle of the discharge lamp 90 sometimes changes while a power supply of the projector 500 is on. The control section 40 may determine the driving cycle only in the startup period. In this case, after the power supply of the projector 500 is turned on, when the driving cycle is determined once, the same driving cycle is executed until the power supply of the projector 500 is turned off.

The control section 40 may determine, for example, immediately before the power supply of the projector 500 is turned off, the driving cycle executed when the power supply of the projector 500 is turned on next time. In this case, for example, it is set in advance to drive the discharge lamp 90 in the driving cycle C2 when the power supply of the projector 500 is turned on for the first time. When the power supply of the projector 500 is turned on for the second and subsequent times, the discharge lamp 90 is driven in the driving cycle determined immediately before the projector 500 is turned off last time.

The control by the control section 40 can also be represented as a discharge lamp driving method. That is, the discharge lamp driving method according to an aspect of this embodiment is a discharge lamp driving method for supplying the driving current I to the discharge lamp 90 including the first electrode 92 and the second electrode 93 and driving the discharge lamp 90. The discharge lamp driving method includes supplying the discharge lamp 90 with the driving current I including the mixed period PH1 in which the first period P1 in which an alternating current is supplied to the discharge lamp 90 and the second period P2 in which a direct current is supplied to the discharge lamp 90 are alternately repeated and the third period P3 alternately including the first direct current period P31 in which a direct current is supplied to the discharge lamp 90 and the second direct current period P32 in which a direct current having a polarity opposite to the polarity of the direct current supplied to the discharge lamp 90 in the first direct current period P31 is supplied to the discharge lamp 90. The length of the second direct current period P32 is smaller than 0.5 ms. The total of the lengths t31 of the first direct current periods P31 in the third period P3 is larger than the length t2 of the second period P2. At least when the lamp voltage Vla is smaller than the first predetermined value or when the cumulative lighting time tt of the discharge lamp 90 is smaller than the second predetermined value, the third period P3 is not provided.

According to this embodiment, in addition to the mixed period PH1 in which the first period P1 in which an alternating current is supplied to the discharge lamp 90 and the second period P2 in which a direct current is supplied to the discharge lamp 90 are alternately repeated, the third period P3 is provided. In the third period P3, the first direct current period P31 and the second direct current period P32 are provided. The length t31 of the first direct current period P31 is larger than the length t32 of the second direct current period P32. The length t32 of the second direct current period P32 is smaller than 0.5 ms (milliseconds). Therefore, in the third period P3, it is possible to heat an electrode functioning as an anode in the first direct current period P31. Note that, in the following explanation, it is assumed that the electrode to be heated is, for example, the first electrode 92.

The total length of the first direct current periods P31 is larger than the length t2 of the second period P2. Therefore, a heat load applied to the first electrode 92 heated in the third period P3 is larger than a heat load applied to the first electrode 92 heated in the second period P2.

In this way, in the third period P3, the heat load applied to the first electrode 92 is large compared with the first period P1 or the second period P2. Therefore, by cyclically providing the third period P3, it is possible to cause the heat load applied to the first electrode 92 to fluctuate large compared with when only the mixed period PH1 is provided. Consequently, even when the discharge lamp 90 is deteriorated, it is easy to melt and grow the protrusion 552p of the first electrode 92. Therefore, according to this embodiment, it is easy to maintain the shape of the protrusion 552p. It is possible to improve the life of the discharge lamp 90.

In the third period P3, the second direct current period P32 is provided in which the direct current having the polarity opposite to the polarity of the direct current supplied to the discharge lamp 90 in the first direct current period P31 is supplied to the discharge lamp 90. Therefore, it is possible to suppress the temperature of the second electrode 93 on the opposite side of the first electrode 92 heated in the third period P3 from excessively dropping. For example, if the temperature of the second electrode 93 excessively drops, when the second electrode 93 is heated and melted, there is fear that it is hard to raise the temperature of the second electrode 93 and it is hard to melt the protrusion 562p of the second electrode 93.

Since the length t32 of the second direct current period P32 is smaller than 0.5 ms (milliseconds), the temperature of the first electrode 92 less easily drops in the second direct current period P32. Therefore, it is easy to suitably heat the first electrode 92 in the first direct current period P31.

For example, in the driving including the third period P3, a relatively large heat load is applied to the protrusion 552p of the first electrode 92 and the protrusion 562p of the second electrode 93 to melt the protrusions 552p and 562p to facilitate the growth of the protrusions 552p and 562p. However, in a stage of a relatively early period in which the discharge lamp 90 is not deteriorated, the protrusions 552p and 562p are relatively easily melted. Therefore, the protrusions 552p and 562p are sometimes excessively melted when the driving including the third period P3 is executed. Consequently, in some case, the protrusions 552p and 562p wear or disappear, an inter-electrode distance between the first electrode 92 and the second electrode 93 increases, and the illuminance of the projector 500 decreases.

On the other hand, according to this embodiment, the third period P3 is not provided when the lamp voltage Vla is smaller than the first predetermined value and when the cumulative lighting time tt is smaller than the second predetermined value. Therefore, it is possible to suppress the protrusions 552p and 562p from wearing or disappearing in an initial stage of the discharge lamp 90. Consequently, it is possible to suppress the illuminance of the projector 500 from decreasing. Note that, in the discharge lamp 90 in the relatively early stage, the first electrode 92 and the second electrode 93 relatively easily grow. Therefore, it is easy to stably maintain the shape of the protrusions 552p and 562p even in driving not including the third period P3.

For example, in the third period P3, when a difference (a ratio) between the length t31 of the first direct current period P31 and the length t32 of the second direct current period P32 is small, a difference between rising width of the temperature of the first electrode 92 in the first direct current period P31 and drop width of the temperature of the first electrode 92 in the second direct current period P32 is small. Therefore, it is hard to raise the temperature of the first electrode 92 in the third period P3. Consequently, there is fear that the heat load applied to the first electrode 92 in the third period P3 cannot be sufficiently increased and the protrusion 552p cannot be sufficiently melted.

On the other hand, according to this embodiment, the length t31 of the first direct current period P31 is ten or more times as large as the length t32 of the second direct current period P32. Therefore, it is possible to set the rising width of the temperature of the first electrode 92 in the first direct current period P31 to be sufficiently large with respect to the drop width of the temperature of the first electrode 92 in the second direct current period P32. Consequently, according to this embodiment, it is possible to suitably apply the heat load to the first electrode 92 in the third period P3. It is easier to maintain the shape of the protrusion 552p.

According to this embodiment, the total of the lengths t31 of the first direct current periods P31 in the third period P3 is equal to or larger than 10 ms (milliseconds) and equal to or smaller than 1.0 s (seconds). Therefore, it is easy to sufficiently increase the heat load applied to the first electrode 92 in the third period P3. It is easier to maintain the shape of the protrusion 552p.

According to this embodiment, the third period P3 is provided between the mixed periods PH1 temporally adjacent to each other. Therefore, it is easy to appropriately provide the third period P3 in which the heat load applied to the first electrode 92 is relatively large. Therefore, according to this embodiment, it is easier to maintain the shape of the protrusion 552p. It is possible to further improve the life of the discharge lamp 90.

In the first period P1 and the second period P2, the heat load applied to the first electrode 92 tends to be smaller in the first period P1. According to this embodiment, the third period P3 is provided immediately after the first period P1. Therefore, it is easier to increase fluctuation in the heat load due to a shift from the mixed period PH1 to the third period P3. Therefore, it is easier to grow the protrusion 552p of the first electrode 92.

According to this embodiment, the polarity of the direct current supplied to the discharge lamp 90 in the first direct current period P31 and the polarity of the direct current supplied to the discharge lamp 90 in the second direct current period P32 are inverted every time the third period P3 is provided. Therefore, it is easy to alternately heat the first electrode 92 and the second electrode 93 in a well-balanced state. Therefore, according to this embodiment, it is possible to grow the protrusion 552p of the first electrode 92 and the protrusion 562p of the second electrode 93 in a well-balanced state. It is easy to maintain both of the shape of the protrusion 552p and the shape of the protrusion 562p.

According to this embodiment, the fourth period P4 is provided in addition to the third period P3. In the fourth period P4, an alternating current having the second frequency f2 smaller than the first frequency f1 of the alternating current in the first period P1 is supplied to the discharge lamp 90. Therefore, a heat load applied to the first electrode 92 in the fourth period P4 is larger than the heat load applied to the first electrode 92 in the first period P1. In the third period P3 and the fourth period P4, the heat load applied to the first electrode 92 tends to be larger in the third period P3. Therefore, for example, when a period in which the third period P3 is cyclically provided lasts long, there is fear that the protrusion 552p of the first electrode 92 is excessively melted.

On the other hand, according to this embodiment, by cyclically providing, in addition to the third period P3, the fourth period P4 in which the heat load applied to the first electrode 92 tends to be smaller than in the third period P3, it is possible to suppress the protrusion 552p from being excessively melted in the third period P3. It is possible adjust the shape of the protrusion 552p.

According to this embodiment, the total length of the first direct current periods P31 is larger than the length of a half cycle of the alternating current having the second frequency f2. Therefore, it is possible to further increase the heat load applied to the first electrode 92 heated in the third period P3.

According to this embodiment, the fourth period P4 is provided between the mixed periods PH1 temporally adjacent to each other. Therefore, it is easy to appropriately provide the fourth period P4 in which the heat load applied to the first electrode 92 is relatively large. Therefore, according to this embodiment, it is easier to maintain the shape of the protrusion 552p. It is possible to further improve the life of the discharge lamp 90.

According to this embodiment, the fourth period P4 is provided immediately after the first period P1. In the first period P1 and the fourth period P4, the alternating current is supplied to the discharge lamp 90. Therefore, a period in which the alternating current is supplied to the discharge lamp 90 lasts. When the first period P1 shifts to the fourth period P4, a frequency changes from the first frequency f1 to the second frequency f2 smaller than the first frequency f1. Consequently, compared with when the fourth period P4 is provided immediately after the second period P2 in which the direct current is supplied to the discharge lamp 90, it is easy to alleviate fluctuation in the heat load applied to the first electrode 92. It is easy to adjust the shape of the protrusion 552p of the first electrode 92 in the fourth period P4.

According to this embodiment, one of the third period P3 and the fourth period P4 is provided at every first predetermined interval. Therefore, it is possible to cyclically increase the heat load applied to the protrusion 552p of the first electrode 92. It is easy to suitably maintain the shape of the protrusion 552p.

According to this embodiment, the fourth period P4 is provided at every second predetermined interval larger than the first predetermined interval. Therefore, it is easy to set a frequency of the provision of the fourth period P4 lower than a frequency of the provision of the third period P3. Consequently, it is possible to provide the fourth period P4 after providing the third period P3 several times. Therefore, it is possible to adjust the shape of the protrusion 552p of the first electrode 92 while suitably melting the protrusion 552p.

According to this embodiment, the first frequency f1 includes a plurality of frequencies different from one another. Therefore, it is possible to cause the heat load applied to the first electrode 92 to fluctuate in the first period P1. Therefore, according to this embodiment, it is easier to grow the protrusion 552p.

According to this embodiment, in the first period P1, the first frequency f1 is smaller in an alternating current period provided temporally later. That is, in the first period P1, the first frequency f1 is the largest in the first alternating current period P11 provided temporally earliest. In other words, in the first frequency f1, the first frequency f11 of the alternating current supplied to the discharge lamp 90 in the first alternating current period P11 is the largest. As the frequency of the alternating current supplied to the discharge lamp 90 is larger, the temperature of the first electrode 92 more easily drops.

Therefore, in the mixed period PH1, by providing, immediately after the second period P2 in which the heat load is larger than in the first period P1, the first alternating current period P11 in which the first frequency f1 is large, it is easy to suddenly drop the temperature of the first electrode 92 heated in the second period P2. It is easy to apply a stimulus due to the fluctuation in the heat load to the first electrode 92. As a result, according to this embodiment, it is easier to grow the protrusion 552p.

According to this embodiment, the start polarity of the fourth period P4 is inverted every time the fourth period P4 is provided. Therefore, even when polarity of the direct current supplied to the discharge lamp 90 in the second period P2 and the third period P3 is inverted, it is possible to invert the polarity when a period immediately before the fourth period P4 shifts to the fourth period P4 and when the fourth period P4 shifts to a period immediately after the fourth period P4. That is, before and after the period shifts, it is possible to invert the polarity of the driving current I supplied to the discharge lamp 90. Therefore, according to this embodiment, it is possible to grow the protrusion 552p of the first electrode 92 and the protrusion 562p of the second electrode 93 in a more well-balanced state. It is easier to maintain the shape of the protrusion 552p and the shape of the protrusion 562p.

According to this embodiment, the polarity of the direct current supplied to the discharge lamp 90 in the second period P2 of the mixed period PH1 is inverted every time the second period P2 is provided. Therefore, in the mixed period PH1, it is possible to grow the protrusion 552p of the first electrode 92 and the protrusion 562p of the second electrode 93 in a well-balanced state. It is easy to maintain both of the shape of the protrusion 552p and the shape of the protrusion 562p.

For example, when the discharge lamp 90 is deteriorated, the protrusion 552p of the first electrode 92 is less easily melted. It is hard to maintain the shape of the protrusion 552p. Therefore, even in the third period P3 in which the heat load applied to the first electrode 92 is relatively large, there is fear that it is hard to sufficiently maintain the shape of the protrusion 552p.

For example, when the driving power Wd supplied to the discharge lamp 90 is relatively large, the heat load applied to the first electrode 92 tends to be large. Therefore, when the third period P3 is provided, there is fear that the heat load applied to the first electrode 92 excessively increases.

As measures against the problems, according to this embodiment, the control section 40 sets the total length of the first direct current periods P31 on the basis of at least one of the lamp voltage Vla and the driving power Wd. Therefore, it is possible to solve at least one of the problems.

Specifically, when the total length of the first direct current periods P31 is set on the basis of the lamp voltage Vla, by setting the total length of the first direct current periods P31 larger as the lamp voltage Vla is larger, it is possible to further increase the heat load applied to the first electrode 92 in the third period P3 when the discharge lamp 90 is deteriorated. Consequently, when the discharge lamp 90 is deteriorated, it is easy to suitably melt the protrusion 552p of the first electrode 92 in the third period P3. It is easy to maintain the shape of the protrusion 552p.

On the other hand, when the total length of the first direct current periods P31 is set on the basis of the driving power Wd, by setting the total length of the first direct current periods P31 smaller as the driving power Wd is larger, when the driving power Wd is relatively large, it is possible to reduce the heat load applied to the first electrode 92 in the third period P3. Consequently, it is possible to suppress the protrusion 552p of the first electrode 92 from being excessively melted. It is easy to maintain the shape of the protrusion 552p.

According to this embodiment, the total length of the first direct current periods P31 is set on the basis of both of the lamp voltage Vla and the driving power Wd. Therefore, it is possible to solve both of the problems.

According to this embodiment, the control section 40 sets the length t2 of the second period P2 on the basis of at least one of the lamp voltage Vla and the driving power Wd. Therefore, by setting the length t2 of the second period P2 larger as the lamp voltage Vla is larger, when the discharge lamp 90 is deteriorated, it is easy to suitably melt the protrusion 552p. It is easy to maintain the shape of the protrusion 552p. By setting the length t2 of the second period P2 smaller as the driving power Wd is larger, it is possible to suppress the protrusion 552p of the first electrode 92 from being excessively melted. It is easy to maintain the shape of the protrusion 552p.

According to this embodiment, the length t4 of the fourth period P4 is equal to or larger than the length of six cycles and equal to or smaller than the length of thirty cycles of the alternating current having the second frequency f2 supplied to the discharge lamp 90 in the fourth period P4. Therefore, it is possible to more suitable adjust the shape of the protrusion 552p of the first electrode 92 in the fourth period P4.

For example, when the discharge lamp 90 is deteriorated and the lamp voltage Vla increases, the driving current I supplied to the discharge lamp 90 decreases. Therefore, a bright spot of arc discharge easily becomes unstable and moves. When the bright spot of the arc discharge moves, a melting position and a melting amount in the first electrode 92 change. Consequently, there is fear that the shape of the first electrode 92 becomes unstable and easily wears.

Similarly, even when the driving power Wd is small, the driving current I decreases. Therefore, there is fear that the bright spot of the arc discharge becomes unstable and the first electrode 92 easily wears.

As measures against the problems, according to this embodiment, the control section 40 sets the first frequency f1 on the basis of at least one of the lamp voltage Vla and the driving power Wd. Therefore, it is possible to solve at least one of the problems.

Specifically, when the first frequency f1 is set on the basis of the lamp voltage Vla, by setting the first frequency f1 larger as the lamp voltage Vla larger, when the discharge lamp 90 is deteriorated, it is easy to stabilize the bright spot of the arc discharge. This is because of the following reason.

When the frequency of the alternating current supplied to the discharge lamp 90 is relatively large, the volume of a portion to be melted in the protrusion 552p of the first electrode 92 is relatively small. The bright spot of the arc discharge is located on a distal end face planarized by melting the protrusion 552p. When the volume of the portion to be melted of the protrusion 552p is small, the area of the planarized distal end face is relatively small. Therefore, a region where the bright spot of the arc discharge moves decreases. It is possible to stabilize the position of the bright spot of the arc discharge.

Therefore, according to this embodiment, when the discharge lamp 90 is deteriorated, it is possible to suppress the first electrode 92 from easily wearing.

On the other hand, when the first frequency f1 is set on the basis of the driving power Wd, by setting the first frequency f1 larger as the driving power Wd is smaller, when the driving power Wd is relatively small, it is possible to set the first frequency f1 relatively large. Consequently, as explained above, it is possible to stabilize the bright spot of the arc discharge. It is possible to suppress the first electrode 92 from easily wearing.

According to this embodiment, the first frequency f1 is set on the basis of both of the lamp voltage Vla and the driving power Wd. Therefore, it is possible to solve both of the problems.

Note that, in this embodiment, configurations and methods explained below can also be adopted.

In this embodiment, the control section 40 only has to not provide the third period P3 in at least when the lamp voltage Vla is smaller than the first predetermined value or when the cumulative lighting time tt is smaller than the second predetermined value. That is, the control section 40 does not have to provide the third period P3 only when the lamp voltage Vla is smaller than the first predetermined value or does not have to provide the third period P3 only when the cumulative lighting time tt is smaller than the second predetermined value.

For example, when the third period P3 is not provided only when the lamp voltage Vla is smaller than the first predetermined value, if the lamp voltage Vla is smaller than the first predetermined value, the control section 40 does not provide the third period P3 irrespective of the cumulative lighting time tt. When the third period P3 is not provided only when the cumulative lighting time tt is smaller than the second predetermined value, if the cumulative lighting time tt is smaller than the second predetermined value, the control section 40 does not provide the third period P3 irrespective of the lamp voltage Vla. Even when the third period P3 is not provided only in one of the cases, it is possible to suppress the illuminance of the projector 500 from decreasing in the initial stage.

In this embodiment, the first period P1, the second period P2, the third period P3, and the fourth period P4 may be provided in any way in the driving cycle C1. For example, in the above explanation, the first period P1 and the second period P2 are only alternately continuously provided in the mixed period PH1. However, not only this, but the first period P1 and the second period P2 may be provided separately from each other. For example, the second period P2 and the third period P3, the second period P2 and the fourth the period P4, and the third period P3 and the fourth period P4 may be respectively continuously provided. In the driving cycle C1, the fourth period P4 does not have to be provided.

The configuration of the driving cycle C2 in this embodiment is not particularly limited as long as the third period P3 is not provided. In the driving cycle C2, the fourth period P4 does not have to be provided.

In this embodiment, the third period P3 and the fourth period P4 provided between the mixed periods PH1 temporally adjacent to each other may be provided immediately after the second period P2.

In this embodiment, the plurality of first frequencies f1 may be provided in any way. In this embodiment, for example, in the first period P1, the first frequency f1 may be larger in an alternating current period provided temporally later.

In this embodiment, the first frequency f1 may be formed by only one frequency. That is, in this embodiment, the alternating current period in the first period P1 may be only one kind.

In this embodiment, the lengths of the alternating current periods included in the first period P1 may be different from one another. That is, the length t11 of the first alternating current period P11, the length t12 of the second alternating current period P12, the length t13 of the third alternating current period P13, and the length t14 of the fourth alternating current period P14 may be different from one another.

In the above explanation, the end polarity of the certain period and the start polarity of the period provided immediately after the certain period are different from each other. However, not only this, but, in this embodiment, the end polarity of the certain period and the start polarity of the period provided immediately after the certain period may be the same.

In this embodiment, the control section 40 may set the total length of the first direct current periods P31 in the third period P3 on the basis of only the lamp voltage Vla or may set the total length of the first direct current periods P31 in the third period P3 on the basis of only the driving power Wd. In this embodiment, the total length of the first direct current periods P31 in the third period P3 does not have to change.

In this embodiment, the control section 40 may set the length t2 of the second period P2 on the basis of only the lamp voltage Vla or may set the length t2 of the second period P2 on the basis of only the driving power Wd. In this embodiment, the length t2 of the second period P2 does not have to change.

In this embodiment, the control section 40 may set the length t2 of the second period P2 on the basis of at least one of the lamp voltage Vla and the driving power Wd every time the second period P2 is provided or may set the length t2 of the second period P2 on the basis of at least one of the lamp voltage Vla and the driving power Wd once every time the mixed period PH1 is provided. When the length t2 of the second period P2 is set every time the second period P2 is provided, the lengths t2 of the second periods P2 are sometimes different from one another in one mixed period PH1. On the other hand, when the length t2 of the second period P2 is set once every time the mixed period PH1 is provided, the lengths t2 of the second periods P2 are the same in one mixed period PH1.

In this embodiment, the control section 40 may set the length t2 of the second period P2 on the basis of at least one of the lamp voltage Vla and the driving power Wd once every time a predetermined number of the mixed periods PH1 are provided. That is, in this embodiment, the control section 40 may change the length t4 of the fourth period P4 on the basis of at least one of the lamp voltage Vla and the driving power Wd.

In this embodiment, the control section 40 may set the length t4 of the fourth period P4 on the basis of at least one of the lamp voltage Vla and the driving power Wd like the total length of the first direct current periods P31 in the third period P3 and the length t2 of the second period P2.

In this embodiment, the control section 40 does not have to invert, every time the second period P2 is provided, the polarity of the direct current supplied to the discharge lamp 90 in the second period P2 of the mixed period PH1. That is, in this embodiment, the second period P2 in which the direct current having the same polarity is supplied to the discharge lamp 90 may be continuously provided twice or more.

In this embodiment, the control section 40 does not have to invert, every time the third period P3 is provided, the polarity of the direct current supplied to the discharge lamp 90 in the first direct current period P31 and the polarity of the direct current supplied to the discharge lamp 90 in the second direct current period P32. That is, in this embodiment, the third period P3 in which the polarity of the direct current supplied to the discharge lamp 90 in the first direct current period P31 and the polarity of the direct current supplied to the discharge lamp 90 in the second direct current period P32 are the same may be continuously provided twice or more.

In this embodiment, the control section 40 may set the first frequency f1 on the basis of only the lamp voltage Vla or may set the first frequency f1 on the basis of the driving power Wd. In this embodiment, the first frequency f1 does not have to change.

Note that, in the embodiments, the example is explained in which the invention is applied to the transmission type projector. However, the invention can be applied to a reflection type projector as well. The "transmission type" means that a liquid crystal light valve including a liquid crystal panel is a type for transmitting light. The "reflection type" means that the liquid crystal light valve is a type for reflecting light. Note that the light modulating device is not limited to the liquid crystal panel or the like and may be a light modulating device including, for example, a micromirror.

In the embodiments, the example of the projector 500 including the three liquid crystal panels 560R, 560G, and 560B (the liquid crystal light valves 330R, 330G, and 330B) is explained. However, the invention can also be applied to a projector including only one liquid crystal panel and a projector including four or more liquid crystal panels.

The configurations explained above can be combined as appropriate as long as the configurations are not contradictory to one another.

Example

In an example, an initial driving cycle was set as the driving cycle C2 and the driving cycle was changed between the driving cycle C1 and the driving cycle C2 on the basis of the predetermined conditions explained above. In a comparative example, the initial driving cycle was set as the driving cycle C1 and the driving cycle was not changed. In other words, in the comparative example, the third period P3 was provided irrespective of the lamp voltage Vla and the cumulative lighting time tt. The initial lamp voltage Vla of a discharge lamp in use was 65 V. In the example, the first predetermined value was set to 70 V and the second predetermined value was set to 100 h (hours).

In the first period P1, the first frequency f11 of the first alternating current period P11 was set to 150 Hz, the first frequency f12 of the second alternating current period P12 was set to 200 Hz, the first frequency f13 of the third alternating current period P13 was set to 250 Hz, and the first frequency f14 of the fourth alternating current period P14 was set to 300 Hz. In the first alternating current period P11 to the fourth alternating current period P14, the lengths of the periods was set the same. The length t1 of the first period P1 was set to 100 ms (milliseconds). The length t2 of the second period P2 was set to 10 ms (milliseconds).

In the third period P3, the length t31 of the first direct current period P31 was set to 10 ms (milliseconds). The length t32 of the second direct current period P32 was set to 0.47 ms (milliseconds). Length t3 of the third period P3 was set to 100 ms (milliseconds). The second frequency f2 of the fourth period P4 was set to 42 Hz. The length t4 of the fourth period P4 was set to 200 ms (milliseconds). The first predetermined interval was set to 30 s (seconds). The second predetermined interval was set to 90 s (seconds).

In each of the example and the comparative example, the discharge lamp was lit and the illuminance of the projector 500 was measured. As a result, in the comparative example, an illuminance maintenance ratio at a point in time when the cumulative lighting time tt reached 2 h (hours) was 96.3%. An illuminance maintenance ratio at a point in time when the cumulative lighting time tt reached 250 h (hours) was 83.0%. On the other hand, in the example, the illuminance maintenance ratio at the point in time when the cumulative lighting time tt reached 2 h (hours) was 99.4%. The illuminance maintenance ratio at the point in time when the cumulative lighting time tt reached 250 h (hours) was 95.0%. Note that the illuminance maintenance ratio is a ratio to illuminance at the time when the discharge lamp is lit for the first time. In the example, the lamp voltage Vla at the point in time when the cumulative lighting time tt reached 250 h (hours) was 75 V. A driving cycle was the driving cycle C1.

From the above results, it has been confirmed that it is possible to suppress a decrease in the illuminance maintenance ratio by driving the discharge lamp not to provide the third period P3 in the initial stage rather than driving the discharge lamp to always provide the third period P3. Therefore, the utility of this example has been confirmed.

The entire disclosure of Japanese Patent Application No. 2016-017803, filed Feb. 2, 2016 is expressly incorporated by reference herein.

What is claimed is:

1. A discharge lamp driving device comprising:
   a discharge lamp driving section configured to supply a driving current to a discharge lamp including a first electrode and a second electrode;
   a control section configured to control the discharge lamp driving section; and
   a detecting section configured to detect an inter-electrode voltage of the discharge lamp, wherein
   the control section is configured to provide
   a mixed period in which a first period in which an alternating current is supplied to the discharge lamp and a second period in which a direct current is supplied to the discharge lamp are alternately repeated and
   a third period alternately including a first direct current period in which a direct current is supplied to the discharge lamp and a second direct current period in which a direct current having a polarity opposite to a polarity of the direct current supplied to the discharge lamp in the first direct current period is supplied to the discharge lamp,
   length of the second direct current period is smaller than 0.5 ms,
   a total of lengths of a plurality of the first direct current periods in the third period is larger than length of the second period,
   the control section is configured not to provide the third period at least when the inter-electrode voltage is smaller than a first predetermined value or when a cumulative lighting time of the discharge lamp is smaller than a second predetermined value.

2. The discharge lamp driving device according to claim 1, wherein the control section is configured not to provide the third period even if the inter-electrode voltage is equal to or larger than the first predetermined value and when the cumulative lighting time is smaller than the second predetermined value.

3. The discharge lamp driving device according to claim 1, wherein length of the first direct current period is ten times or more the length of the second direct current period.

4. The discharge lamp driving device according to claim 1, wherein the total of the lengths of the first direct current periods in the third period is equal to or larger than 10 ms and equal to or smaller than 1.0 s.

5. The discharge lamp driving device according to claim 1, wherein
   a plurality of the mixed periods are provided, and
   the third period is provided between the mixed periods temporally adjacent to each other and is provided immediately after the first period.

6. The discharge lamp driving device according to claim 1, wherein
   a plurality of the third periods are provided, and
   a polarity of the direct current supplied to the discharge lamp in the first direct current period and a polarity of the direct current supplied to the discharge lamp in the second direct current period are inverted every time the third period is provided.

7. The discharge lamp driving device according to claim 6, wherein
   the control section is configured to provide a fourth period in which an alternating current having a second frequency smaller than a first frequency of the alternating current supplied to the discharge lamp in the first period is supplied to the discharge lamp, and
   the total of the lengths of the first direct current periods in the third period is larger than length of a half cycle of the alternating current having the second frequency.

8. The discharge lamp driving device according to claim 7, wherein
   a plurality of the mixed periods are provided, and
   the fourth period is provided between the mixed periods temporally adjacent to each other and is provided immediately after the first period.

9. The discharge lamp driving device according to claim 7, wherein the control section is configured to provide one of the third period and the fourth period at first predetermined interval.

10. The discharge lamp driving device according to claim 9, wherein the control section is configured to provide the fourth period at second predetermined interval larger than the first predetermined interval.

11. A projector comprising:
a discharge lamp configured to emit light;
the discharge lamp driving device according to claim 1;
a light modulating device configured to modulate light emitted from the discharge lamp according to an image signal; and
a projection optical system configured to project the light modulated by the light modulating device.

12. A projector comprising:
a discharge lamp configured to emit light;
the discharge lamp driving device according to claim 2;
a light modulating device configured to modulate light emitted from the discharge lamp according to an image signal; and
a projection optical system configured to project the light modulated by the light modulating device.

13. A projector comprising:
a discharge lamp configured to emit light;
the discharge lamp driving device according to claim 3;
a light modulating device configured to modulate light emitted from the discharge lamp according to an image signal; and
a projection optical system configured to project the light modulated by the light modulating device.

14. A projector comprising:
a discharge lamp configured to emit light;
the discharge lamp driving device according to claim 4;
a light modulating device configured to modulate light emitted from the discharge lamp according to an image signal; and
a projection optical system configured to project the light modulated by the light modulating device.

15. A projector comprising:
a discharge lamp configured to emit light;
the discharge lamp driving device according to claim 5;
a light modulating device configured to modulate light emitted from the discharge lamp according to an image signal; and
a projection optical system configured to project the light modulated by the light modulating device.

16. A projector comprising:
a discharge lamp configured to emit light;
the discharge lamp driving device according to claim 6;
a light modulating device configured to modulate light emitted from the discharge lamp according to an image signal; and
a projection optical system configured to project the light modulated by the light modulating device.

17. A projector comprising:
a discharge lamp configured to emit light;
the discharge lamp driving device according to claim 7;
a light modulating device configured to modulate light emitted from the discharge lamp according to an image signal; and
a projection optical system configured to project the light modulated by the light modulating device.

18. A projector comprising:
a discharge lamp configured to emit light;
the discharge lamp driving device according to claim 8;
a light modulating device configured to modulate light emitted from the discharge lamp according to an image signal; and
a projection optical system configured to project the light modulated by the light modulating device.

19. A projector comprising:
a discharge lamp configured to emit light;
the discharge lamp driving device according to claim 9;
a light modulating device configured to modulate light emitted from the discharge lamp according to an image signal; and
a projection optical system configured to project the light modulated by the light modulating device.

20. A discharge lamp driving method for supplying a driving current to a discharge lamp including a first electrode and a second electrode and driving the discharge lamp,
the discharge lamp driving method comprising supplying the discharge lamp with the driving current including
a mixed period in which a first period in which an alternating current is supplied to the discharge lamp and a second period in which a direct current is supplied to the discharge lamp are alternately repeated and
a third period alternately including a first direct current period in which a direct current is supplied to the discharge lamp and a second direct current period in which a direct current having a polarity opposite to a polarity of the direct current supplied to the discharge lamp in the first direct current period is supplied to the discharge lamp, wherein
length of the second direct current period is smaller than 0.5 ms,
a total of lengths of a plurality of the first direct current periods in the third period is larger than length of the second period, and
the third period is not provided at least when the interelectrode voltage is smaller than a first predetermined value or a cumulative lighting time of the discharge lamp is smaller than a second predetermined value.

* * * * *